United States Patent
Seo et al.

(10) Patent No.: US 9,397,865 B2
(45) Date of Patent: Jul. 19, 2016

(54) METHOD AND APPARATUS FOR RECEIVING SIGNAL IN WIRELESS COMMUNICATION SYSTEM

(71) Applicant: LG ELECTRONICS INC., Seoul (KR)

(72) Inventors: Hanbyul Seo, Anyang-si (KR);
Byounghoon Kim, Anyang-si (KR);
Joonkui Ahn, Anyang-si (KR);
Dongyoun Seo, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 21 days.

(21) Appl. No.: 14/371,692

(22) PCT Filed: Jan. 11, 2013

(86) PCT No.: PCT/KR2013/000255
§ 371 (c)(1),
(2) Date: Jul. 10, 2014

(87) PCT Pub. No.: WO2013/105821
PCT Pub. Date: Jul. 18, 2013

(65) Prior Publication Data
US 2015/0003407 A1 Jan. 1, 2015

Related U.S. Application Data

(60) Provisional application No. 61/585,631, filed on Jan. 11, 2012, provisional application No. 61/586,150, filed on Jan. 13, 2012, provisional application No. 61/599,944, filed on Feb. 17, 2012.

(51) Int. Cl.
*H04L 25/02* (2006.01)
*H04L 5/00* (2006.01)
(Continued)

(52) U.S. Cl.
CPC ............ *H04L 25/0224* (2013.01); *H04L 5/001* (2013.01); *H04L 5/0048* (2013.01); *H04L 5/0053* (2013.01); *H04W 24/00* (2013.01);
(Continued)

(58) Field of Classification Search
CPC .................................................. H04L 25/0224
USPC .......................................................... 370/330
See application file for complete search history.

(56) References Cited

U.S. PATENT DOCUMENTS 9,054,842 B2 * 6/2015 Bhattad ................... H04L 5/005
9,119,082 B1 * 8/2015 Gomadam ............... H04B 1/28
(Continued)

FOREIGN PATENT DOCUMENTS

WO  WO 2011/085195 A1  7/2011

OTHER PUBLICATIONS

Catt, "Reference signals for E-PDCCH", 3GPP TSG RAN WG1 Meeting #67, R1-113741, San Francisco, USA, Nov. 14-18, 2011, 2 pages.
(Continued)

*Primary Examiner* — Parth Patel
(74) *Attorney, Agent, or Firm* — Birch, Stewart, Kolasch & Birch, LLP

(57) ABSTRACT

One embodiment of the present invention is a method in which a terminal receives a signal in a wireless communication system, comprising: a step of receiving a subframe; and a step of performing a channel estimation using either a cell-specific reference signal (CRS) or a channel state information-reference signal (CSI-RS) depending on the information relating to a time-frequency resource to which the subframe pertains.

10 Claims, 12 Drawing Sheets

(a)

(b)

(51) Int. Cl.
*H04W 24/00* (2009.01)
*H04W 48/16* (2009.01)

(52) U.S. Cl.
CPC ............. *H04L5/0016* (2013.01); *H04L 5/0035* (2013.01); *H04L 5/0055* (2013.01); *H04L 5/0073* (2013.01); *H04W 48/16* (2013.01)

(56) References Cited

U.S. PATENT DOCUMENTS

| | | | | |
|---|---|---|---|---|
| 2010/0122121 A1* | 5/2010 | Krishnamurthy | ..... | H04W 24/02 714/48 |
| 2010/0260136 A1* | 10/2010 | Fan | ..... | H04W 74/002 370/330 |
| 2010/0322097 A1* | 12/2010 | Jen | ..... | H04L 1/1854 370/252 |
| 2011/0110251 A1* | 5/2011 | Krishnamurthy | ... | H04W 72/082 370/252 |
| 2011/0176581 A1* | 7/2011 | Thomas | ..... | H04B 1/7075 375/146 |
| 2011/0237243 A1* | 9/2011 | Guvenc | ..... | H04L 5/0032 455/423 |
| 2012/0113914 A1* | 5/2012 | Zhao | ..... | H04L 5/0007 370/329 |
| 2012/0120842 A1* | 5/2012 | Kim | ..... | H04B 7/024 370/252 |
| 2012/0120903 A1* | 5/2012 | Kim | ..... | H04B 7/024 370/329 |
| 2012/0207043 A1* | 8/2012 | Geirhofer | ..... | H04L 5/0048 370/252 |
| 2012/0207099 A1* | 8/2012 | Lindh | ..... | H04L 5/0057 370/329 |
| 2012/0213109 A1* | 8/2012 | Xu | ..... | H04B 7/024 370/252 |
| 2012/0300718 A1* | 11/2012 | Ji | ..... | H04L 5/0051 370/329 |
| 2013/0003604 A1* | 1/2013 | Blankenship | ..... | H04L 5/0053 370/255 |
| 2013/0003668 A1* | 1/2013 | Xiao | ..... | H04L 5/001 370/329 |
| 2013/0039284 A1* | 2/2013 | Marinier | ..... | H04L 5/001 370/329 |
| 2013/0044664 A1* | 2/2013 | Nory | ..... | H04L 1/0045 370/311 |
| 2013/0044727 A1* | 2/2013 | Nory | ..... | H04L 5/0092 370/330 |
| 2013/0084910 A1* | 4/2013 | Suzuki | ..... | H04W 24/02 455/515 |
| 2013/0114441 A1* | 5/2013 | Yoo | ..... | H04L 1/0026 370/252 |
| 2013/0114574 A1* | 5/2013 | Ng | ..... | H04W 56/0045 370/336 |
| 2014/0044070 A1* | 2/2014 | Chen | ..... | H04B 7/0486 370/329 |
| 2014/0056279 A1* | 2/2014 | Chen | ..... | H04W 52/04 370/330 |
| 2014/0153427 A1* | 6/2014 | Seo | ..... | H04L 1/20 370/252 |
| 2014/0204853 A1* | 7/2014 | Ko | ..... | H04L 5/00 370/329 |
| 2014/0247775 A1* | 9/2014 | Frenne | ..... | H04L 5/0048 370/329 |
| 2014/0286288 A1* | 9/2014 | Park | ..... | H04W 72/14 370/329 |
| 2014/0295883 A1* | 10/2014 | Kang | ..... | G01S 5/02 455/456.1 |
| 2014/0328302 A1* | 11/2014 | Park | ..... | H04L 5/0037 370/329 |
| 2014/0334416 A1* | 11/2014 | Ko | ..... | H04L 5/0053 370/329 |
| 2015/0029885 A1* | 1/2015 | Seo | ..... | H04W 24/10 370/252 |
| 2015/0036652 A1* | 2/2015 | Lee | ..... | H04L 5/0057 370/330 |

OTHER PUBLICATIONS

Fujitsu, "Reference signals and transmission options for E-PDCCH", 3GPP TSG RAN WG1 Meeting #67, R1-114184, San Francisco, USA, Nov. 14-18 2011, pp. 1-4.

Motorola Mobility, "Interference Measurements based on CSI-RS", 3GPP TSG RAN1 #67, R1-114023, San Francisco, USA, Nov. 14-18, 2011, pp. 1-4.

Renesas Mobile Europe Ltd., "Reference signals for E-PDCCH", 3GPP TSG-RAN WG1 Meeting #67, R1-113899, San Francisco, USA, Nov. 14-18, 2011, 3 pages.

* cited by examiner

FIG. 6
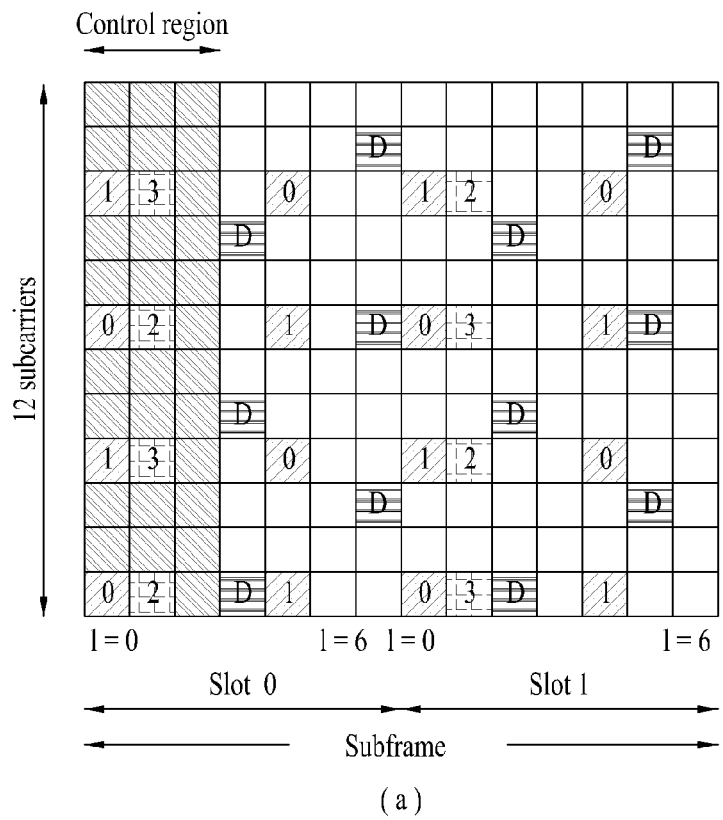
(a)
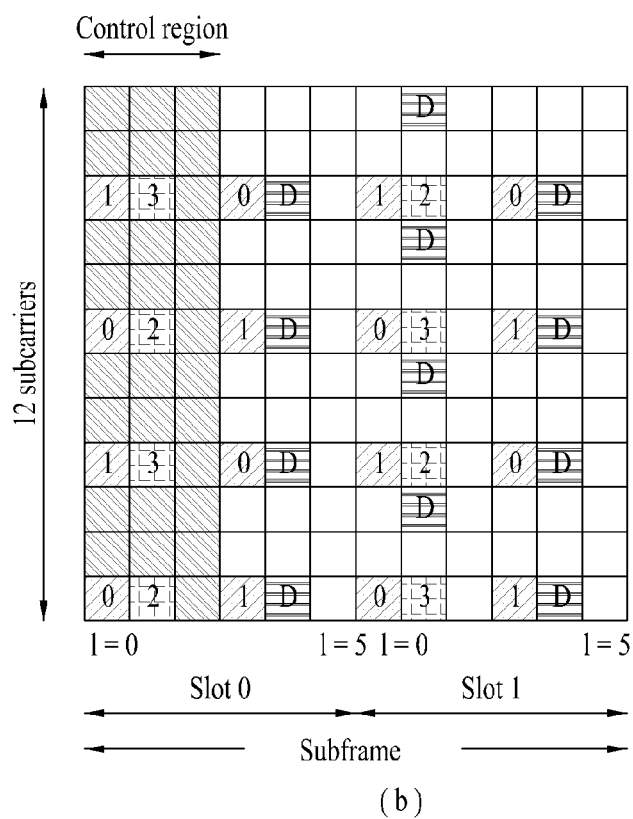
(b)

METHOD AND APPARATUS FOR RECEIVING SIGNAL IN WIRELESS COMMUNICATION SYSTEM

CROSS REFERENCE TO RELATED APPLICATIONS

This application is the National Phase of PCT International Application No. PCT/KR2013/000255, filed on Jan. 11, 2013, which claims priority under 35 U.S.C. 119(e) to U.S. Provisional Application Nos. 61/585,631 filed on Jan. 11, 2012, 61/586,150 filed on Jan. 13, 2012 and 61/599,944 filed on Feb. 17, 2012, all of which are hereby expressly incorporated by reference into the present application.

TECHNICAL FIELD

The present invention relates to a wireless communication system, and more particularly, to a method of estimating a channel of a user equipment and/or demodulating a control channel in case of employing E-PDCCH (enhanced physical downlink control channel) and apparatus therefor.

BACKGROUND ART

Wireless communication systems have been widely deployed to provide various types of communication services such as voice or data services. Generally, a wireless communication system is a multiple access system capable of supporting communication with multiple users by sharing available system resources (bandwidth, transmit power, etc.). Multiple access systems include, for example, a code division multiple access (CDMA) system, a frequency division multiple access (FDMA) system, a time division multiple access (TDMA) system, an orthogonal frequency division multiple access (OFDMA) system, a single carrier frequency division multiple access (SC-FDMA) system, a multi carrier frequency division multiple access (MC-FDMA) system, etc.

DISCLOSURE OF THE INVENTION

Technical Task

The technical task of the present invention is to demodulate a control channel of a type corresponding to either PDCCH or E-PDCCH in a prescribed resource in accordance with configuration and to define a type of a reference signal used for channel estimation and corresponding operations.

Technical tasks obtainable from the present invention are non-limited by the above-mentioned technical task. And, other unmentioned technical tasks can be clearly understood from the following description by those having ordinary skill in the technical field to which the present invention pertains.

Technical Solutions

In a $1^{st}$ technical aspect of the present invention, provided herein is a method of receiving a signal received by a user equipment in a wireless communication system, including the steps of receiving a subframe and performing a channel estimation using either a cell specific reference signal (CRS) or a channel state information-reference signal (CSI-RS) in accordance with an information related to a time-frequency resource having the subframe correspond thereto.

In a $2^{nd}$ technical aspect of the present invention, provided herein is a user equipment device in a wireless communication system, including a receiving module and a processor performing a channel estimation using either a cell specific reference signal (CRS) or a channel state information-reference signal (CSI-RS) in accordance with an information related to a time-frequency resource having a received subframe correspond thereto.

The following matters may be included in the $1^{st}$ and $2^{nd}$ technical aspects of the present invention.

If the channel estimation is performed using the CRS, the user equipment may demodulate PDCCH (physical downlink control channel) only. If the channel estimation is performed using the CSI-RS, the user equipment may demodulate E-PDCCH (enhanced-physical downlink control channel) only.

The information related to the time-frequency resource may include a subframe set configured to estimate a channel using the CRS.

If the channel estimation is performed using the CSI-RS, the user equipment may be set not to perform an interference measurement using a CRS transmitted resource element, an RRM/RLM (radio resource management/radio link monitoring) measurement using the CRS, and a demodulation of PDSCH (physical downlink shared channel) using the CRS.

If the channel estimation is performed using the CSI-RS, an interference measurement of the user equipment may be performed using a zero power CSI-RS.

If the subframe corresponds to a CSI reference resource, an interference measurement for reporting the CSI may be performed based on a reference signal used for the channel estimation of the subframe.

If the subframe comprises an MBSFN (multicast broadcast signal frequency network) subframe, an interference measurement for reporting the CSI may be performed based on the CSI-RS.

If the user equipment measures interferences in a plurality of subframes including the subframe, an interference measured in a subframe for performing the channel estimation using the CRS and an interference measured in a subframe for performing the channel estimation using the CSI-RS may not be considered together.

If the user equipment receives a prescribed information, both of the interference measured in the subframe for performing the channel estimation using the CRS and the interference measured in the subframe for performing the channel estimation using the CSI-RS may be considered.

If the interference measurement in the subframe for performing the channel estimation using the CSI-RS is performed using a zero power CSI-RS, the prescribed information may indicate whether a transmission power of a whole serving transmitting point of the user equipment is zero in the zero power CSI-RS.

The information related to the time-frequency resource may indicate whether the subframe corresponds to a virtual primary cell (Pcell) or a virtual secondary cell (Scell).

If the subframe corresponds to a virtual Pcell, the channel estimation may use the CRS. If the subframe corresponds to a virtual Scell, the channel estimation may use the CSI-RS.

And, a frequency resource of the subframe may correspond to a single component carrier.

Advantageous Effects

According to the present invention, it is able to reduce a burden for a user equipment that should modulate both PDCCH and E-PDCCH unnecessarily. And, it is able to reduce burdens for a user equipment because the user equipment does not need to perform channel estimation based on both a cell-specific reference signal and a channel state information reference signal and operations related to the channel estimation.

Effects obtainable from the present invention are non-limited by the above mentioned effect. And, other unmentioned effects can be clearly understood from the following description by those having ordinary skill in the technical field to which the present invention pertains.

DESCRIPTION OF DRAWINGS

The accompanying drawings, which are included to provide a further understanding of the invention and are incorporated in and constitute a part of this specification, illustrate embodiments of the invention and together with the description serve to explain the principles of the invention.

FIG. 6 is a diagram to describe a reference signal.

BEST MODE FOR INVENTION

Figure 1:
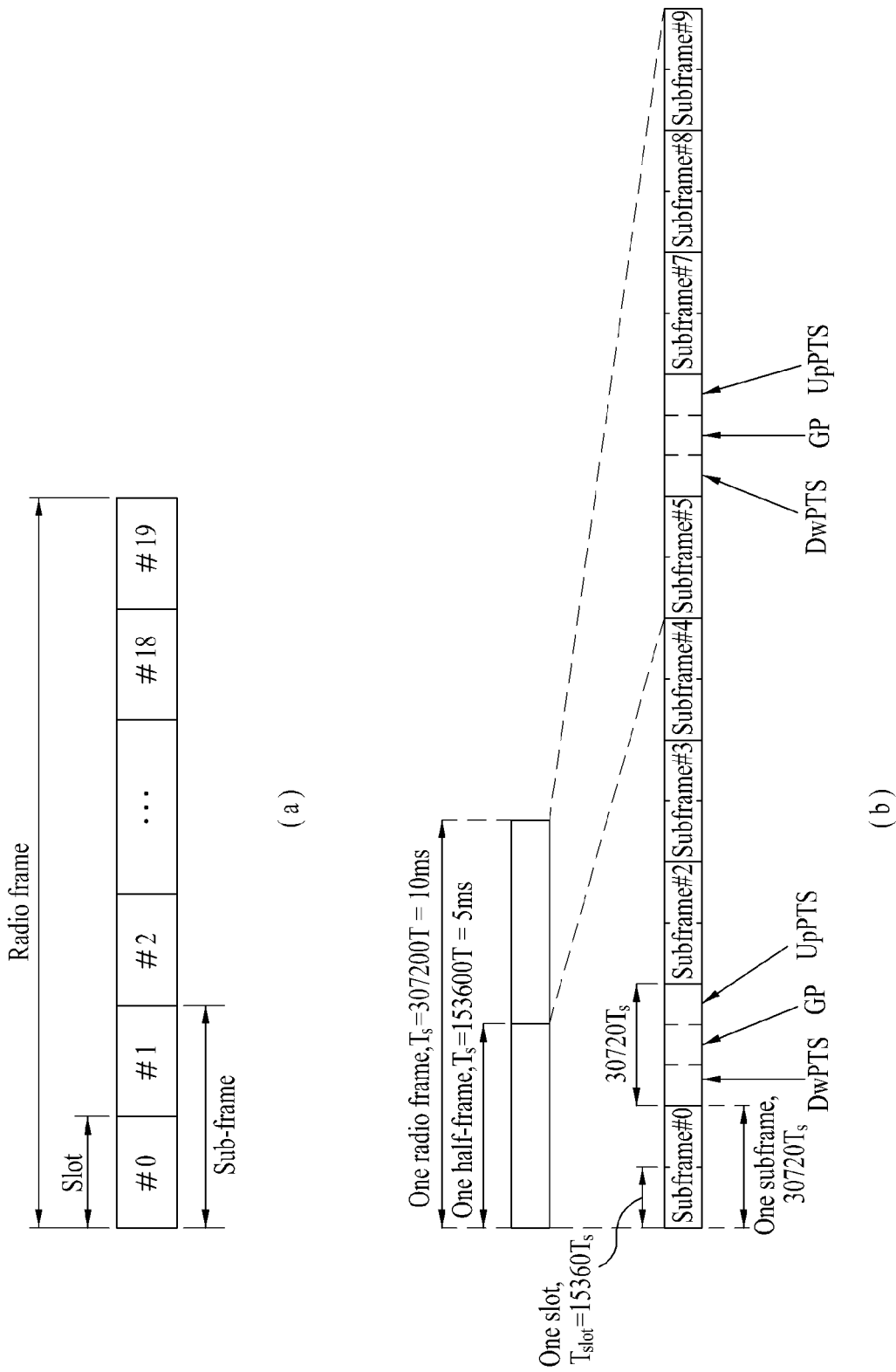
FIG. 1 is a diagram for a structure of a radio frame.

The following embodiments correspond to combinations of elements and features of the present invention in prescribed forms. And, the respective elements or features may be considered as selective unless they are explicitly mentioned. Each of the elements or features can be implemented in a form failing to be combined with other elements or features. Moreover, an embodiment of the present invention may be implemented by combining elements and/or features together in part. A sequence of operations explained for each embodiment of the present invention may be modifiable. Some configurations or features of one embodiment may be included in another embodiment or substituted with corresponding configurations or features of another embodiment.

In the present specification, embodiments of the present invention are described centering on the data transmission/reception relations between a base station and a terminal. In this case, the base station may be meaningful as a terminal node of a network which directly performs communication with the terminal. In this disclosure, a specific operation explained as performed by a base station may be performed by an upper node of the base station in some cases.

In particular, in a network constructed with a plurality of network nodes including a base station, it is apparent that various operations performed for communication with a terminal can be performed by a base station or other networks other than the base station. 'Base station (BS)' may be substituted with such a terminology as a fixed station, a Node B, an eNode B (eNB), an access point (AP) and the like. A relay may be substituted with such a terminology as a relay node (RN), a relay station (RS) and the like. And, 'terminal' may be substituted with such a terminology as a user equipment (UE), a mobile station (MS), a mobile subscriber station (MSS), a subscriber station (SS) and the like.

Specific terminologies used for the following description may be provided to help the understanding of the present invention. And, the use of the specific terminology may be modified into another form within the scope of the technical idea of the present invention.

Occasionally, to prevent the present invention from getting unclear, structures and/or devices known to the public may be skipped or represented as block diagrams centering on the core functions of the structures and/or devices. Wherever possible, the same reference numbers will be used throughout the drawings to refer to the same or like parts in this specification.

Embodiments of the present invention may be supported by the disclosed standard documents of at least one of wireless access systems including IEEE 802 system, 3GPP system, 3GPP LTE system, 3GPP LTE-A (LTE-Advanced) system and 3GPP2 system. In particular, the steps or parts, which are not explained to clearly reveal the technical idea of the present invention, in the embodiments of the present invention may be supported by the above documents. Moreover, all terminologies disclosed in this document may be supported by the above standard documents.

The following description of embodiments of the present invention may apply to various wireless access systems including CDMA (code division multiple access), FDMA (frequency division multiple access), TDMA (time division multiple access), OFDMA (orthogonal frequency division multiple access), SC-FDMA (single carrier frequency division multiple access) and the like. CDMA can be implemented with such a radio technology as UTRA (universal terrestrial radio access), CDMA 2000 and the like. TDMA can be implemented with such a radio technology as GSM/GPRS/EDGE (Global System for Mobile communications)/General Packet Radio Service/Enhanced Data Rates for GSM Evolution). OFDMA can be implemented with such a radio technology as IEEE 802.11 (Wi-Fi), IEEE 802.16 (WiMAX), IEEE 802.20, E-UTRA (Evolved UTRA), etc. UTRA is a part of UMTS (Universal Mobile Telecommunications System). 3GPP (3rd Generation Partnership Project) LTE (long term evolution) is a part of E-UMTS (Evolved UMTS) that uses E-UTRA. The 3GPP LTE adopts OFDMA in downlink (hereinafter abbreviated) DL and SC-FDMA in uplink (hereinafter abbreviated UL). And, LTE-A (LTE-Advanced) is an evolved version of 3GPP LTE. WiMAX may be explained by IEEE 802.16e specifications (e.g., WirelessMAN-OFDMA reference system) and advanced IEEE 802.16m specifications (e.g., WirelessMAN-OFDMA advanced system). For clarity, the following description mainly concerns 3GPP LTE system or 3GPP LTE-A system, by which the technical idea of the present invention may be non-limited.

A structure of a radio frame is described with reference to FIG. 1 as follows.

In a cellular OFDM radio packet communication system, UL/DL (uplink/downlink) data packet transmission is performed by a unit of subframe. And, one subframe is defined as a predetermined time interval including a plurality of OFDM symbols. In the 3GPP LTE standard, a type-1 radio frame structure applicable to FDD (frequency division duplex) and a type-2 radio frame structure applicable to TDD (time division duplex) are supported.

FIG. 1 (*a*) is a diagram for a structure of a radio frame of type 1. A DL (downlink) radio frame includes 10 subframes. Each of the subframes includes 2 slots. And, a time taken to transmit one subframe is defined as a transmission time interval (hereinafter abbreviated TTI). For instance, one subframe may have a length of 1 ms and one slot may have a length of 0.5 ms. One slot may include a plurality of OFDM symbols in time domain or may include a plurality of resource blocks (RBs) in frequency domain. Since 3GPP system uses OFDMA in downlink, OFDM symbol indicates one symbol duration. The OFDM symbol may be named SC-FDMA symbol or symbol duration. Resource block (RB) is a resource allocation unit and may include a plurality of contiguous subcarriers in one slot.

The number of OFDM symbols included in one slot may vary in accordance with a configuration of CP (cyclic prefix). The CP may be categorized into an extended CP and a normal CP. For instance, in case that OFDM symbols are configured by the normal CP, the number of OFDM symbols included in one slot may be 7. In case that OFDM symbols are configured by the extended CP, since a length of one OFDM symbol increases, the number of OFDM symbols included in one slot may be smaller than that of the case of the normal CP. In case of the extended CP, for instance, the number of OFDM symbols included in one slot may be 6. If a channel status is unstable (e.g., a UE is moving at high speed), it may be able to use the extended CP to further reduce the inter-symbol interference.

When a normal CP is used, since one slot includes 7 OFDM symbols, one subframe includes 14 OFDM symbols. In this case, first 2 or 3 OFDM symbols of each subframe may be allocated to PDCCH (physical downlink control channel), while the rest of the OFDM symbols are allocated to PDSCH (physical downlink shared channel).

FIG. 1 (b) is a diagram for a structure of a radio frame of type 2. The type-2 radio frame includes 2 half frames. Each of the half frame includes 5 subframes, DwPTS (downlink pilot time slot), GP (guard period) and UpPTS (uplink pilot time slot). And, one of the subframes includes 2 slots. The DwPTS is used for initial cell search, synchronization or channel estimation in a user equipment. The UpPTS is used for channel estimation in a base station and uplink transmission synchronization of a user equipment. The guard period is a period for eliminating interference generated in uplink due to multi-path delay of a downlink signal between uplink and downlink. Meanwhile, irrespective of a type of a radio frame, 1 subframe consists of 2 slots.

The above-described structures of the radio frame are just exemplary. And, the number of subframes included in a radio frame, the number of slots included in the subframe and the number of symbols included in the slot may be modified in various ways.

Figure 2:
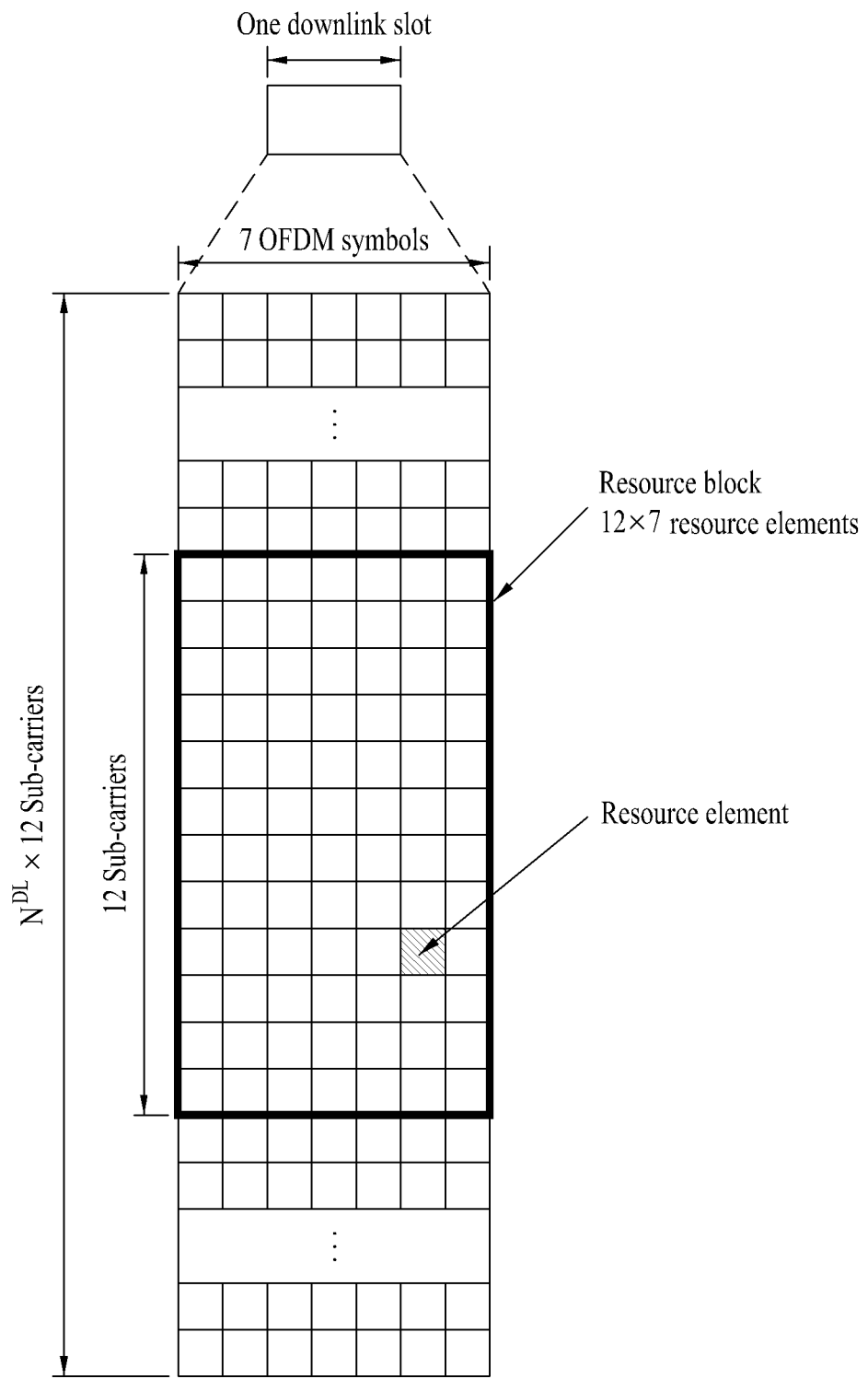
FIG. 2 is a diagram of a resource grid in a downlink slot.

FIG. 2 is a diagram of a resource grid in a downlink (DL) slot. One downlink (DL) slot may include 7 OFDM symbols in a time domain and one resource block (RB) may include 12 subcarriers in a frequency domain, by which the present invention may be non-limited. For instance, in case of a normal cyclic prefix (CP), one slot includes 7 OFDM symbols. Yet, in case of an extended CP, one slot may include 6 OFDM symbols. Each element on a resource grid may be named a resource element (hereinafter abbreviated RE). One resource block includes 12×7 resource elements. The number $N^{DL}$ of resource blocks included in a DL slot may depend on a DL transmission bandwidth. And, the structure of an uplink (UL) slot may be identical to that of the DL slot.

Figure 3:
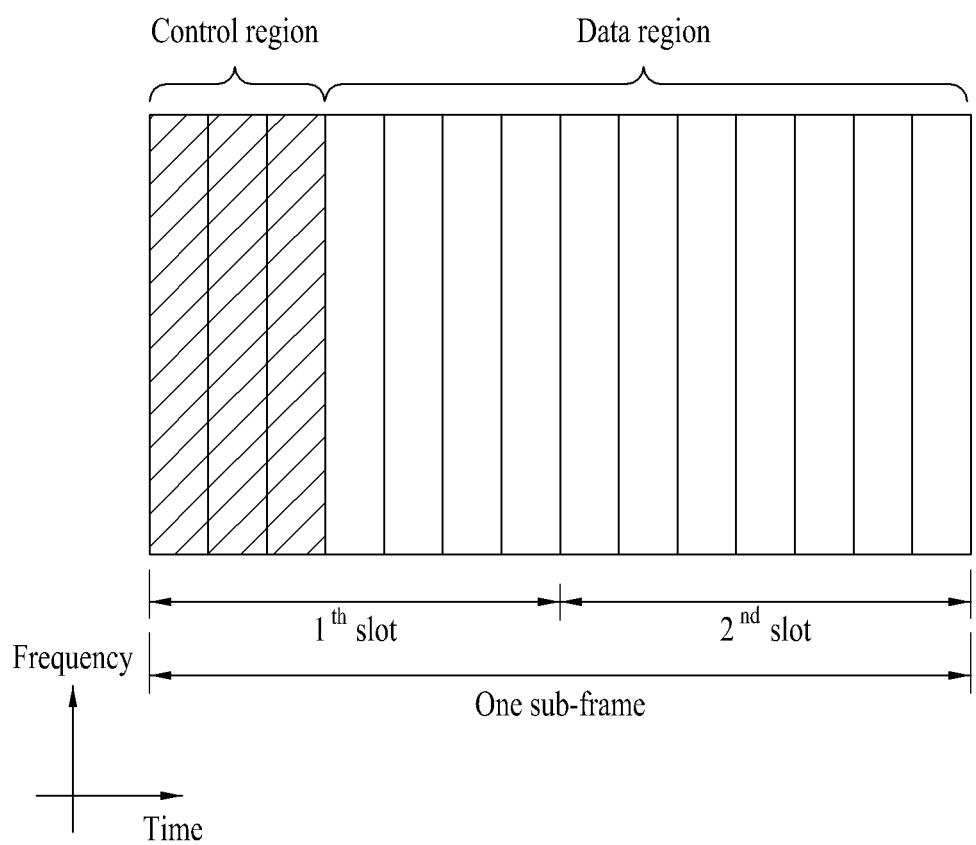
FIG. 3 is a diagram for a structure of a downlink subframe.

FIG. 3 is a diagram for a structure of a downlink (DL) subframe. Maximum 3 OFDM symbols situated in a head part of a first slot of one subframe correspond to a control region to which a control channel is assigned. The rest of OFDM symbols correspond to a data region to which PDSCH (physical downlink shared channel) is assigned. Examples of DL control channels used by 3GPP LTE system may include PCFICH (Physical Control Format Indicator Channel), PDCCH (Physical Downlink Control Channel), PHICH (Physical hybrid automatic repeat request indicator Channel) and the like. The PCFICH is transmitted in a first OFDM symbol of a subframe and includes information on the number of OFDM symbols used for a transmission of a control channel within the subframe. The PHICH includes HARQ ACK/NACK signal in response to a UL transmission. Control information transmitted on PDCCH is called DCI (downlink control information). The DCI includes a UL or DL scheduling information or a UL transmission power control command and the like. PDCCH may include a transmission format and resource allocation information of DL-SCH (downlink shared channel), a transmission format and resource allocation information of UL-SCH (uplink shared channel), a paging information on PCH (paging channel), a system information on DL-SCH, a resource allocation information of a higher-layer control message such as a random access response transmitted on PDSCH, a transmission power control command set for individual user equipments within a user equipment group, a transmission power control command, an activation of VoIP (voice over IP) and the like. A plurality of PDCCHs may be transmitted in a control region. A user equipment may be able to monitor a plurality of PDCCHs. PDCCH is transmitted on aggregation of at least one or more contiguous CCEs (control channel elements). In this case, the CCE is a logical assignment unit used to provide PDCCH with a coding rate based on a radio channel state. The CCE corresponds to a plurality of REGs (resource element groups). PDCCH format and the number of PDCCH bits are determined depending on the number of CCEs. A base station determines PDCCH format in accordance with DCI to transmit to a user equipment and attaches CRC (cyclic redundancy check) to control information. The CRC is masked with an identifier (e.g., RNTI (radio network temporary identifier)) in accordance with an owner or a purpose of use. If PDCCH is provided for a specific user equipment, CRC may be masked with an identifier (e.g., C-RNTI (cell-RNTI)) of the corresponding user equipment. If PDCCH is provided for a paging message, CRC may be masked with a paging identifier (e.g., P-RNTI (paging-RNTI)). If PDCCH is provided for system information (particularly, SIB (system information block)), CRC may be masked with a system information identifier and a system information-RNTI (SI-RNTI). In order to indicate a random access response to a transmission of a random access preamble of a user equipment, CRC may be masked with RA-RNTI (random access-RNTI).

Figure 4:
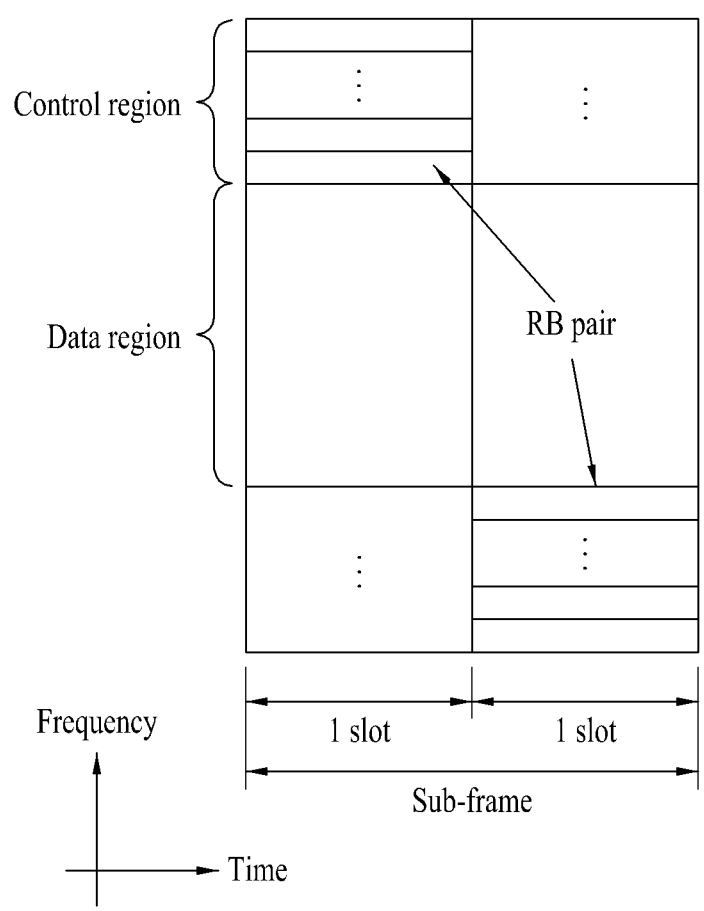
FIG. 4 is a diagram for a structure of an uplink subframe.

FIG. 4 is a diagram for a structure of an uplink (UL) subframe. A UL subframe may be divided into a control region and a data region in a frequency domain. A physical UL control channel (PUCCH) including UL control information may be assigned to the control region. And, a physical UL shared channel (PUSCH) including user data may be assigned to the data region. In order to maintain single carrier property, one user equipment does not transmit PUCCH and PUSCH simultaneously. PUCCH for one user equipment may be allocated to a resource block pair (RB pair) in a subframe. Resource blocks belonging to the resource block pair may occupy different subcarriers for 2 slots. Namely, a resource block pair allocated to PUCCH is frequency-hopped on a slot boundary.

DCI Format

According to preset LTE-A (Release 10), DCI formats 0, 1, 1A, 1B, 1C, 1D, 2, 2A, 2B, 2C, 3, 3A and 4 are defined. In this case, the DCI formats 0, 1A, 3 and 3A are regulated to have the same message size to reduce the blind decoding count mentioned in the following description. Depending on the usage of control information to be transmitted, these DCI formats can be categorized into i) DCI formats 0 and 4 used for a UL grant, ii) DCI formats 1, 1A, 1B, 1C, 1D, 2, 2A, 2B and 2C used for a DL scheduling assignment, and iii) DCI formats 3 and 3A for a power control command.

The DCI format 0 used for the UL grant may include a carrier offset (e.g., carrier indicator) necessary in association with carrier aggregation mentioned in the following description, an offset (e.g., a flag for format 0/format 1A differentiation) used for differentiating the DCI format 0 and the DCI format 1A from each other, a hoping flag (a frequency hopping flag) indicating whether frequency hopping is used for UL PUSCH transmission, an information (e.g., resource block assignment) on assignment of a resource block to be used for PUSCH transmission by a user equipment, a modulation and coding scheme, a new data indicator used to empty a buffer for an initial transmission in association with HARQ process, a TPC command for scheduled for PUSCH, a cyclic shift information (e.g., a cyclic shift for DMRS and OCC index) for DMRS (Demodulation reference signal), a UL index required for TDD operation, a channel quality information (e.g., Channel Quality Indicator) request information (e.g., CSI request), and the like. On the other hand, since the DCI format 0 uses synchronous HARQ, it does not include a redundancy version like DCI formats related to the DL scheduling assignment. The carrier offset is not included in DCI format if cross carrier scheduling is not used.

The DCI format 4 is newly added by LTE-A Release 10 and is provided to support that spatial multiplexing is applied to a UL transmission in LTE-A. Compared to the DCI format 0, the DCI format 4 includes more informations for the spatial multiplexing. Hence, the DCI format 4 has a message size greater than that of the DCI format 0 and further includes a control information in addition to an existing control information included in the DCI format 0. In particular, in case of the DCI format 4, a modulation & coding scheme for a $2^{nd}$ transport block, a precoding information for a multi-antenna transmission and a sounding reference signal (SRS) request information are further included. On the other hand, since the DCI format 4 has a size greater than that of the DCI format 0, it does not include an offset for differentiating the DCI format 0 and the DCI format 1A from each other.

The DCI formats 1, 1A, 1B, 1C, 1D, 2, 2A, 2B and 2C related to DL scheduling assignment can be mainly sorted into the DCI formats 1, 1A, 1B, 1C and 1D not supportive of spatial multiplexing and the DCI formats 2, 2A, 2B and 2C supportive of spatial multiplexing.

The DCI format 1C supports a contiguous frequency assignment as a compact downlink assignment only and does not include a carrier offset and a redundancy version in comparison with other formats.

The DCI format 1A is a format for a downlink scheduling and a random access procedure. In the DCI format 1A, a carrier offset, an indicator indicating whether a downlink distributive transmission is used, a PDSCH resource allocation information, a modulation & coding scheme, a redundancy version, an HARQ processor number to indicate a processor used for a soft combining, a new data offset used to empty a buffer for an initial transmission in association with an HARQ process, a transmission power control command for PUCCH, a UL index required for a TDD operation and the like can be included.

In case of the DCI format 1, most of control information is similar to that of the DCI format 1A. Yet, compared to the DCI format 1A related to the contiguous resource allocation, the DCI format 1 supports a non-contiguous resource allocation. Hence, since the DCI format 1 further includes a resource allocation header, a control signaling overhead increases more or less as a trade-off of the increase of flexibility of resource allocation.

Compared to the DCI format 1, the DCI format 1B and the DCI format 1D are common to each other in further including a precoding information. The DCI format 1B includes a PMI confirmation, while the DCI format 1D includes a DL power offset information. Most of control informations included in each of the DCI format 1B and the DCI format 1D coincide with those included in the DCI format 1A.

Each of the DCI formats 2, 2A, 2B and 2C basically includes most of control informations included in the DCI format 1A and further includes informations for spatial multiplexing. In this case, the further included informations may correspond to a modulation & coding scheme for a $2^{nd}$ transport block, a new data offset and a redundancy version.

The DCI format 2 supports a closed-loop spatial multiplexing, while the DCI format 2A supports an open-loop spatial multiplexing. The DCI format 2B supports a dual layer spatial multiplexing combined with beamforming and further includes a cyclic shift information for DMRS. The DCI format 2C can be understood as an extension of the DCI format 2B and supports spatial multiplexing up to 8 layers.

Each of the DCI format 3 and the DCI format 3A can be used to complement transmission power control information included in the DCI formats for the UL grant and DL scheduling assignment mentioned in the foregoing description, i.e., to support a semi-persistent scheduling. In case of the DCI format 3, a 1-bit command is used per user equipment. In case of the DCI format 3A, a 2-bit command is used per user equipment.

One of the DCI formats mentioned in the above description is transmitted on a single PDCCH and a plurality of PDCCHs can be transmitted within a control region. And, a user equipment is able to monitor a plurality of the PDCCHs.

PDCCH Processing

In transmitting a DCI on PDCCH, a CRC (cyclic redundancy check) is attached to the DCI. In doing so, the DCI is masked with a radio network temporary identifier (RNTI). In this case, the RNTI may include an RNTI differing for the purpose of transmission of DCI. In particular, P-RNTI may be usable for a paging message related to a network initiated connection setup. RA-RNTI may be usable for a case related to a random access. SI-RNTI may be usable for a system information block (SIB). Moreover, in case of a unicast transmission, a unique UE identifier 'C-RNTI' is usable. The CRC attached DCI is encoded into prescribed codes and is then adjusted to be suitable for a size of resource used for a transmission through a rate-matching.

In the above-mentioned PDCCH transmission, when PDCCH is mapped to REs, contiguous logical assignment unit 'control channel element (CCE)' is used for efficient processing. CCE consists of 36 REs, which corresponds to 9 REG (resource element group) units. The number of CCEs required for specific PDCCH varies depending on a DCI payload (i.e., control information size), a cell bandwidth, a channel coding rate and the like. In particular, the number of CCEs for specific PDCCH can be defined according to PDCCH format shown in Table 1.

TABLE 1

| PDCCH format | No. of CCE | No. of REG | PDCCH bit No. |
|---|---|---|---|
| 0 | 1 | 9 | 72 |
| 1 | 2 | 18 | 144 |
| 2 | 4 | 36 | 288 |
| 3 | 8 | 72 | 576 |

Referring to Table 1, the number of CCEs varies depending on a PDCCH format. For instance, while a transmitting side uses PDCCH format 0, if a channel state becomes poor, the current format is changed into PDCCH format 2. Thus, the PDCCH format can be used adaptively.

Blind Decoding

For PDCCH, as mentioned in the foregoing description, one of 4 kinds of formats is usable, which is not notified to a user equipment. Hence, the user equipment should perform a decoding without being aware of the PDCCH format, which is called a blind decoding. Yet, if the user equipment decodes all possible CCEs used in DL for each PDCCH format, it puts a considerable burden on the user equipment. Hence, a search space is defined in consideration of restriction on a scheduler and a decoding attempt count.

In particular, a search space is a set of PDCCH candidates consisting of CCEs on which the user equipment should attempt to perform a decoding. In this case, the aggregation level and the number of PDCCH candidates can be defined as Table 2.

TABLE 2

| | Search space | | No. of |
| --- | --- | --- | --- |
| | Aggregation level | Size (CCE unit) | PDCCH candidates |
| UE-specific | 1 | 6 | 6 |
| | 2 | 12 | 6 |
| | 4 | 8 | 2 |
| | 8 | 16 | 2 |
| Common | 4 | 16 | 4 |
| | 8 | 16 | 2 |

Referring to Table 2, since there are 4 kinds of aggregation levels, a user equipment has a plurality of search spaces in accordance with each aggregation level.

Moreover, the search space, as shown in Table 2, can be divided into a user specific (UE-specific) search space and a common search space. The UE-specific search space (USS) is provided for specific user equipments. Each of the specific user equipments checks an RNTI masked on PDCCH and a CRC thereof by monitoring a UE-specific search space (e.g., attempting to decode a PDCCH candidate set in accordance with a possible DCI format). If the check is valid, each of the specific user equipments can obtain control information.

The common search space (CSS) is provided for a case (e.g., a dynamic scheduling on system information, a paging message, etc.) that a multitude of user equipments or all user equipments need to receive PDCCH. Yet, the common search space may be used for a specific user equipment for the purpose of resource management. Meanwhile, the common search space may overlap the UE-specific search space. Control information for a multitude of the user equipments may be masked with one of a random access identifier (e.g., RA-RNTI), a system information identifier (e.g., SI-RNTI), and a paring identifier (e.g., P-RNTI).

The search space can be determined in detail by Formula 1 as follows.

$$L\{(Y_k+m') \bmod \lfloor N_{CCE,k}/L \rfloor\}+i \quad \text{[Formula 1]}$$

In this case, the L indicates an aggregation level. The $Y_k$ indicates a variable determined by RNTI and a subframe number k. If carrier aggregation is applied as the PDCCH candidate number, the m' is expressed as $m'=m+M^{(L)} \cdot n_{CI}$. Otherwise, it is $m=0, \ldots, M^{(L)}-1$ as $m'=m$, where $M^{(L)}$ is the number of PDCCH candidates. The $N_{CCE,k}$ indicates the total number of CCEs of a control region in $k^{th}$ subframe. The i is a factor for designating an individual CCE of each PDCCH candidate in PDCCH and is expressed as $i=0, \ldots, L-1$. In case of a common search space, the $Y_k$ is always determined as 0.

Figure 5:
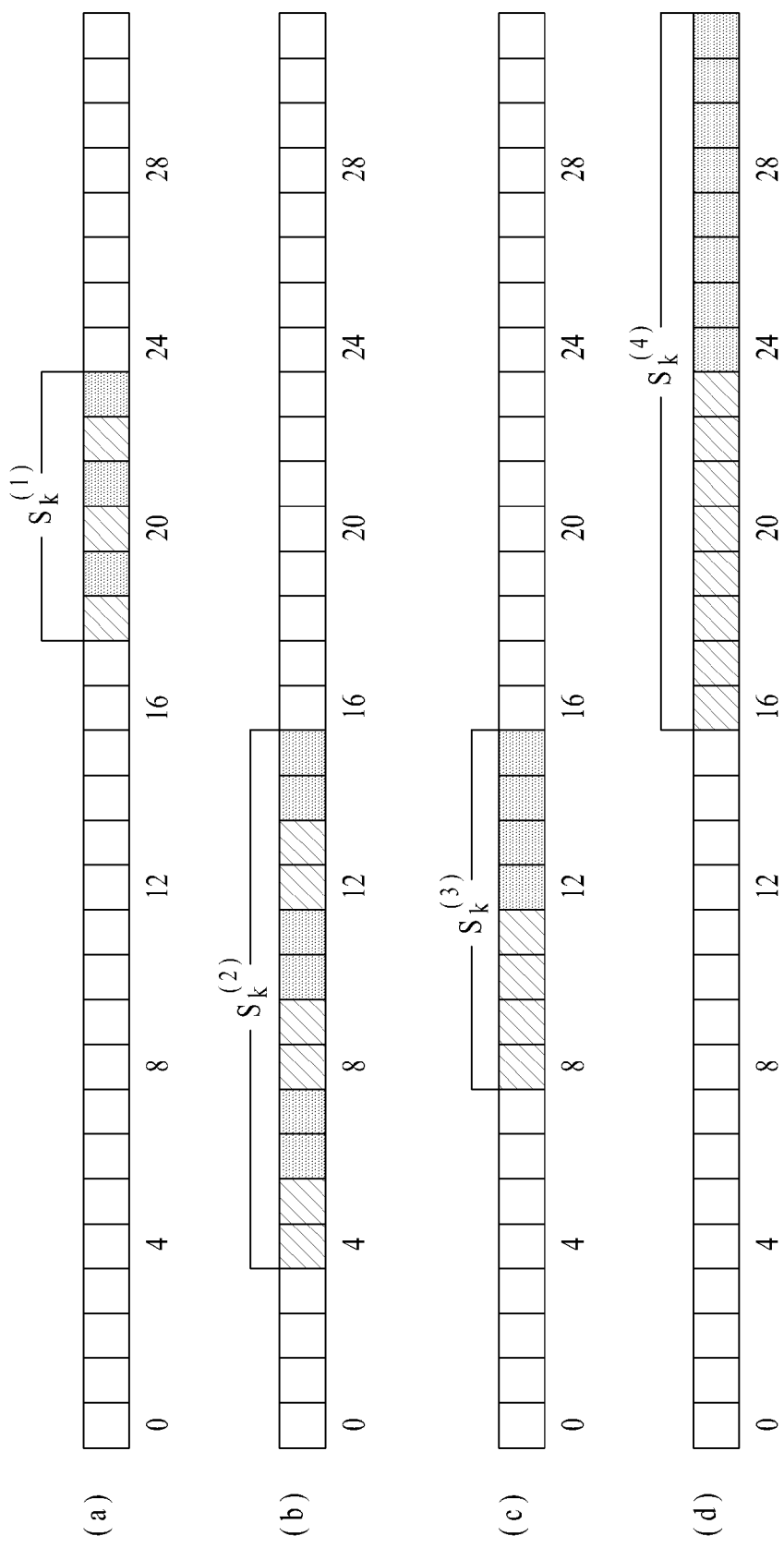
FIG. 5 is a diagram to describe a search space.

FIG. 5 shows a UE-specific search space (e.g., a shaded part) on each aggregation level that can be defined in accordance with Formula 1. In this case, carrier aggregation is not used. For clarity of the following description, $N_{CCE,k}$ is set to 32 for example.

FIG. 5 (a), FIG. 5 (b), FIG. 5 (b) and FIG. 5 (a) show a case of an aggregation level 1, a case of an aggregation level 1, a case of an aggregation level 2, a case of an aggregation level 4, a case of an aggregation level 8, respectively. In FIG. 5, numerals indicate CCE numbers, respectively. In FIG. 5, as mentioned in the foregoing description, a start CCE of a search space on each aggregation level is determined as an RNTI and a subframe number k. In particular, the start CCE may be determined different on each aggregation level due to a modulo function and L in the same subframe for a single user equipment. And, the start CCE is always determined as a multiple of a corresponding aggregation level due to L. In the following description, $Y_k$ is assumed as a CCE number 18 for example. A user equipment attempts a decoding sequentially from the start CCE by units of CCEs determined according to a corresponding aggregation level. For instance, in FIG. 5 (b), the user equipment attempts the decoding by 2-CCE unit in accordance with an aggregation level from a CCE number 4 that is the start CCE.

As mentioned in the foregoing description, a user equipment attempts a decoding on a search space. And, a count of this decoding attempt is determined as a transmission mode determined through a DCI format and RRC signaling. If carrier aggregation is not applied, since a user equipment should consider two kinds of DCI sizes (DCI format 0/1A/3/3A and DCI format 1C), maximum 12 decoding attempts are necessary. For a UE-specific search space, two kinds of DCI sizes are considered for the PDCCH candidate number (e.g., 6+6+2+2=16), maximum 32 decoding attempts are necessary. Therefore, if the carrier aggregation is not applied, maximum 44 decoding attempts are necessary.

On the other hand, if the carrier aggregation is applied, since decodings for UE-specific search spaces amounting to the number of DL resources (component carriers) and DCI format 4 are further added, the maximum decoding count further increases.

Reference Signal (RS)

When a packet is transmitted in a wireless communication system, since the transmitted packet is transmitted on a radio channel, signal distortion may occur in the course of the transmission. In order for a receiving side to correctly receive the distorted signal, distortion in a received signal should be corrected using channel information. In order to acquire the channel information, after a signal known to both a receiving side and a transmitting side has been transmitted, the channel information can be acquired with a degree of distortion on receiving the signal on a channel. This signal may be called a pilot signal or a reference signal.

In case of transmitting and receiving data using multiple antennas (MIMO), a channel status between a transmitting antenna and a receiving antenna should be obtained to receive a correct signal. Hence, a separate reference signal needs to be present for each transmitting antenna.

Reference signals can be categorized into a UL (uplink) reference signal and a DL (downlink) reference signal. Currently, LTE system has UL reference signals as follow:

i) DeModulation-Reference Signal (DM-RS) for channel estimation for coherent demodulation of information transmitted on PUSCH and PUCCH; and ii) Sounding Reference Signal (SRS) for a base station to measure a UL channel equality on a network-different frequency.

On the other hand, DL reference signals may include:

i) Cell-specific Reference Signal (CRS) shared by all user equipments in a cell;

ii) UE-specific Reference Signal for a specific user equipment only;

iii) DeModulation-Reference Signal (DM-RS) transmitted for coherent demodulation in case of transmission of PDSCH;

iv) Channel State Information-Reference Signal (CSI-RS) for delivering a channel state information (CSI) in case of transmission of DL DMRS;

v) MBSFN Reference Signal transmitted for coherent demodulation for a signal transmitted in MBSFN (Multimedia Broadcast Single Frequency Network) mode; and vi) Positioning Reference Signal used to estimate geographical location information of a user equipment.

Reference signals can be mainly sorted into two types depending on their purposes. In particular, there are a reference signal for the purpose of channel information acquisition and a reference signal used for data demodulation. Since the object of the former reference signal is to enable a user equipment (UE) to acquire channel information in DL, the former reference signal should be transmitted on a wideband. And, a user equipment should receive the former reference signal despite not receiving DL data in a specific subframe. Moreover, the former reference signal is used in such a situation as a handover and the like. The latter reference signal is sent to a corresponding resource together with a DL signal. A user equipment performs a channel measurement by receiving the corresponding reference signal and is then able to demodulate data. And, the latter reference signal should be transmitted on a data carried region.

CRS is used for the purposes of channel information acquisition and data demodulation. And, a UE-specific reference signal is used for the purpose of data demodulation only. The CRS is transmitted in each subframe for wideband. And, reference signals for maximum 4 antennas are transmitted depending on the number of transmitting antennas of a base station.

For instance, if the number of transmitting antennas of a base station is 2, CRS for antenna port #0 and CRS for antenna port #1 are transmitted. For another instance, if the number of transmitting antennas of a base station is 4, CRSs for antenna ports #0 to #3 are transmitted, respectively.

FIG. 6 is a diagram to illustrate a pattern for CRS and DRS defined in a legacy 3GPP LTE system (e.g., Release-8) to be mapped to a downlink (DL) resource block (RB) pair. A DL RB pair as a unit of mapping a reference signal can be expressed as a unit of '(1 subframe in time)×(12 subcarriers in frequency)'. In particular, a single RB pair has a length of 14 OFDM symbols in case of a normal CP [FIG. 6 (a)] or a length of 12 OFDM symbols in case of an extended CP [FIG. 6 (b)].

FIG. 6 shows a position of a reference signal on an RB pair in a system including a base station that supports 4 transmitting antennas. Referring to FIG. 6, resource elements (REs) denoted by 0, 1, 2 and 3 represent positions of CRSs for antenna port indexes 0, 1, 2 and 3, respectively. Meanwhile, a resource element denoted by D in FIG. 6 indicates a position of DMRS.

Carrier Aggregation

Figure 7:
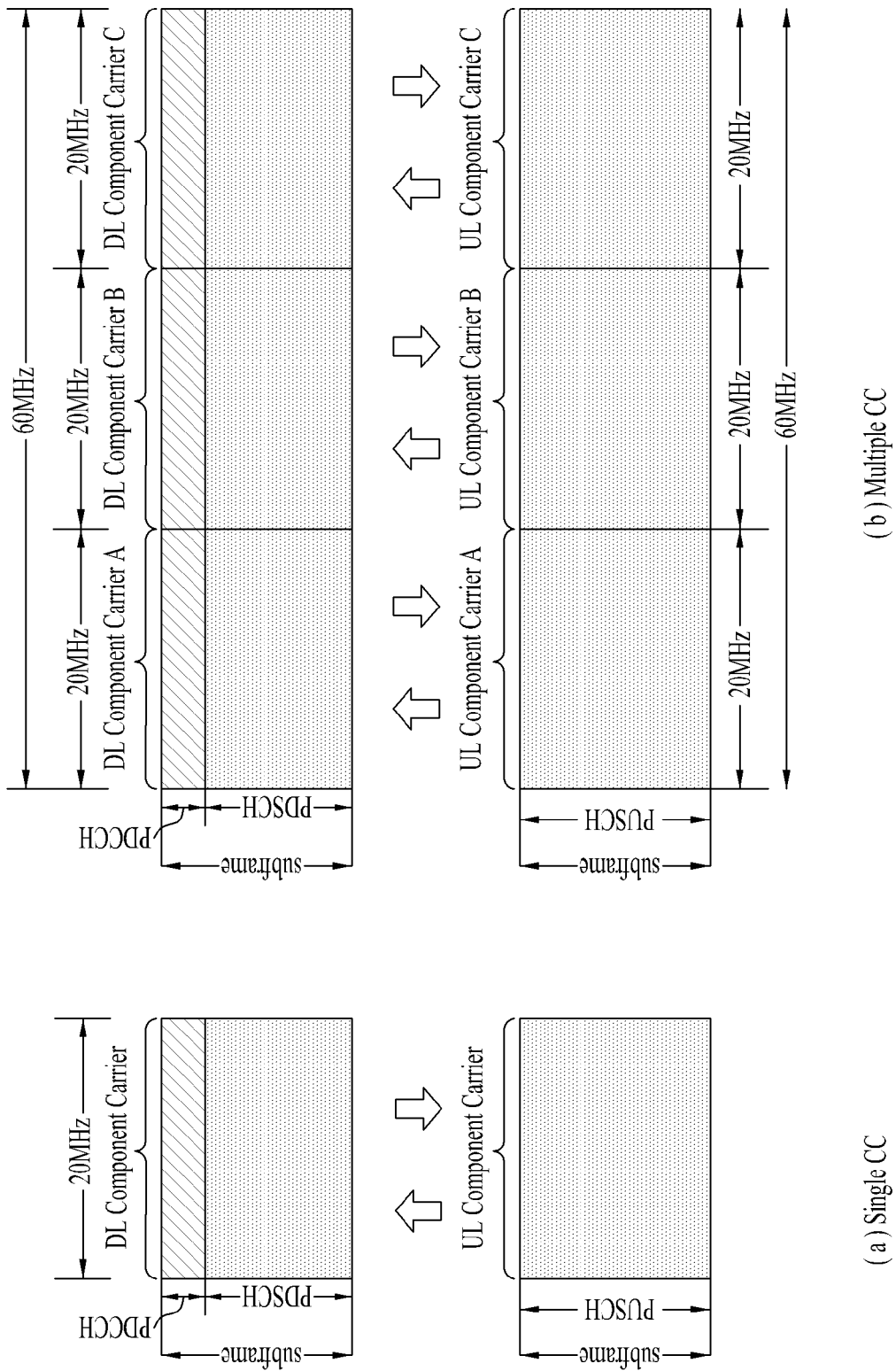
FIG. 7 is a diagram to describe carrier aggregation.

FIG. 7 is a diagram to describe carrier aggregation. Prior to describing carrier aggregation, the concept of a cell introduced to manage and control a radio resource in LTE-A is described as follows. First of all, a cell can be understood as a combination of a DL resource and a UL resource. In this case, the UL resource is not an essential element. Hence, a cell can be configured with a DL resource only or both a DL resource and a UL resource. This is the current definition by LTE-A Release 10. On the contrary, a cell can be configured with a UL resource only. A DL resource can be named a DL component carrier (DL CC) and a UL resource can be named a UL component carrier (UL CC). DL CC and UL CC can be represented as carrier frequency. And, the carrier frequency means a center frequency in a corresponding cell.

Cells can be classified into a primary cell (PCell) operating on a primary frequency and a secondary cell (SCell) operating on a secondary frequency. PCell and SCell can be commonly named a serving cell. A cell, which is indicated when a user equipment performs an initial connection establishment process, a connection re-establishment process or a handover process, can become the PCell. In particular, the PCell can be understood as a cell that becomes a control related center in a carrier aggregation environment that will be described later. A user equipment can receive assignment of PUCCH in its PCell and is then able to transmit the PUCCH. The SCell can be configured after completion of RRC (radio resource control) connection establishment and may be used to provide an additional radio resource. In the carrier aggregation environment, a serving cell except PCell may be regarded as SCell. If carrier aggregation is not configured for a user equipment in RRC_CONNECTED state or a user equipment in RRC_CONNECTED state does not support carrier aggregation, there exists a single serving cell configured with PCell only. On the other hand, if carrier aggregation is configured for a user equipment in RRC_CONNECTED state, at least one or more serving cells exist. And, PCell and all SCells are included in the entire serving cells. For a user equipment supportive of carrier aggregation, a network can configure at least one SCell in addition to PCell initially configured in the connection establishment process after initiation of an initial security activation process.

In the following description, carrier aggregation is explained with reference to FIG. 7. First of all, carrier aggregation is the technology introduced to enable a wider band to be used in order to meet the demand for a high and fast transmission rate. Carrier aggregation may be defined as an aggregation of at least two component carriers (CCs) differing from each other in carrier frequency. Referring to FIG. 7, FIG. 7 (a) shows a subframe in case that a single CC is used in a legacy LTE system and FIG. 7 (b) shows a subframe in case of using carrier aggregation. FIG. 7 (b) shows one example that 3 CCs on 20 MHz are used to support a bandwidth of total 60 MHz. In this case, the CCs may be contiguous or non-contiguous.

A user equipment can simultaneously receive and monitor DL data through a plurality of DL CCs. A linkage between each DL CC and UL CC can be indicated by system information. DL CC/UL CC link may be fixed to a system or configured semi-statically. Moreover, even if a whole system band is configured with N CCs, a frequency band which can be monitored/received by a specific user equipment may be limited to M (<N) CCs. Various parameters for carrier aggregation may be set by a cell-specific, UE group-specific or UE-specific method.

Figure 8:
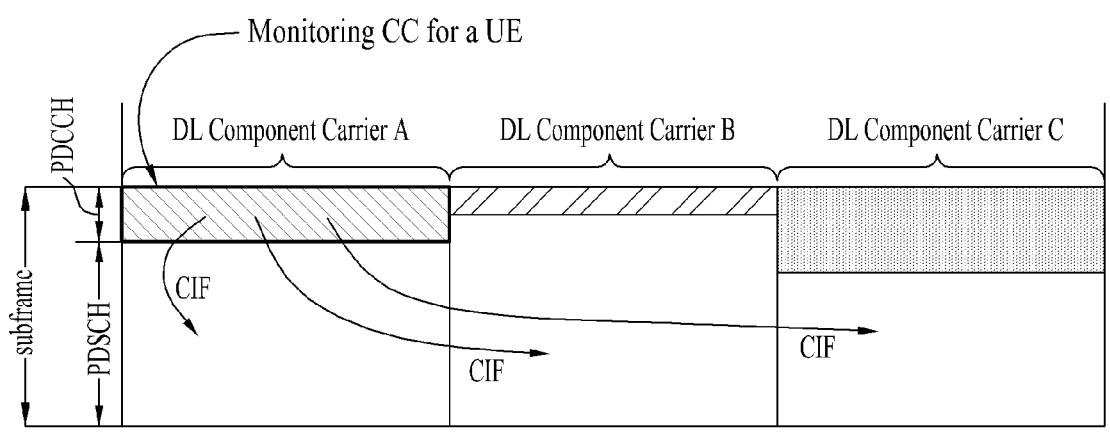
FIG. 8 is a diagram to describe cross carrier scheduling.

FIG. 8 is a diagram to describe cross carrier scheduling. First of all, cross carrier scheduling means that a control region of DL CC of one of a plurality of serving cells includes all DL scheduling assignment information of another DL CC or that a control region of DL CC of one of a plurality of serving cells includes all UL scheduling grant information on a plurality of DL CCs linked to the corresponding DL CC.

A carrier indicator field (CIF) is described as follows.

First of all, as mentioned in the foregoing description, CIF may or may not be included in a DCI format transmitted on PDCCH. If the CIF is included therein, it indicates that cross carrier scheduling is applied. In case that cross carrier scheduling is not applied, DL scheduling assignment information is valid on DL CC on which current DL scheduling assignment information is carried. Moreover, a UL scheduling grant is valid for one UL CC linked to DL CC on which DL scheduling assignment information is carried.

If cross carrier scheduling is applied, it indicates a CC related to DL scheduling assignment information carried on PDCCH in a prescribed DL CC. For instance, referring to FIG. 9, DL assignment information on DL CC B and DL CC C, i.e., information on PDSCH resource is transmitted through PDCCH in a control region on DL CC A. A user equipment can recognize a resource region of PDSCH and a corresponding CC through CIF by monitoring the DL CC A.

Whether CIF is included in PDCCH or not can be set semi-static and can be enabled UE-specifically by upper layer signaling. If the CIF is disabled, PDCCH on a specific DL CC allocates a PDSCH resource on the same DL CC and is able to allocate PUSCH resource on UL CC linked to the specific DL CC. In this case, the same coding scheme, CCE based resource mapping and DCI format of an existing PDCCH structure are applicable thereto.

On the contrary, if the CIF is enabled, PDCCH on a specific DL CC can allocate PDSCH/PUSCH resource on a single DL/UL CC indicated by the CIF among a plurality of aggregated CCs. In this case, the CIF can be additionally defined in an existing PDCCH DCI format. For instance, the CIF may be defined as a field having a fixed 3-bit length or a CIF location may be fixed irrespective of a DCI format size. In this case, the same coding scheme, CCE based resource mapping and DCI format of an existing PDCCH structure are applicable thereto.

Figure 9:
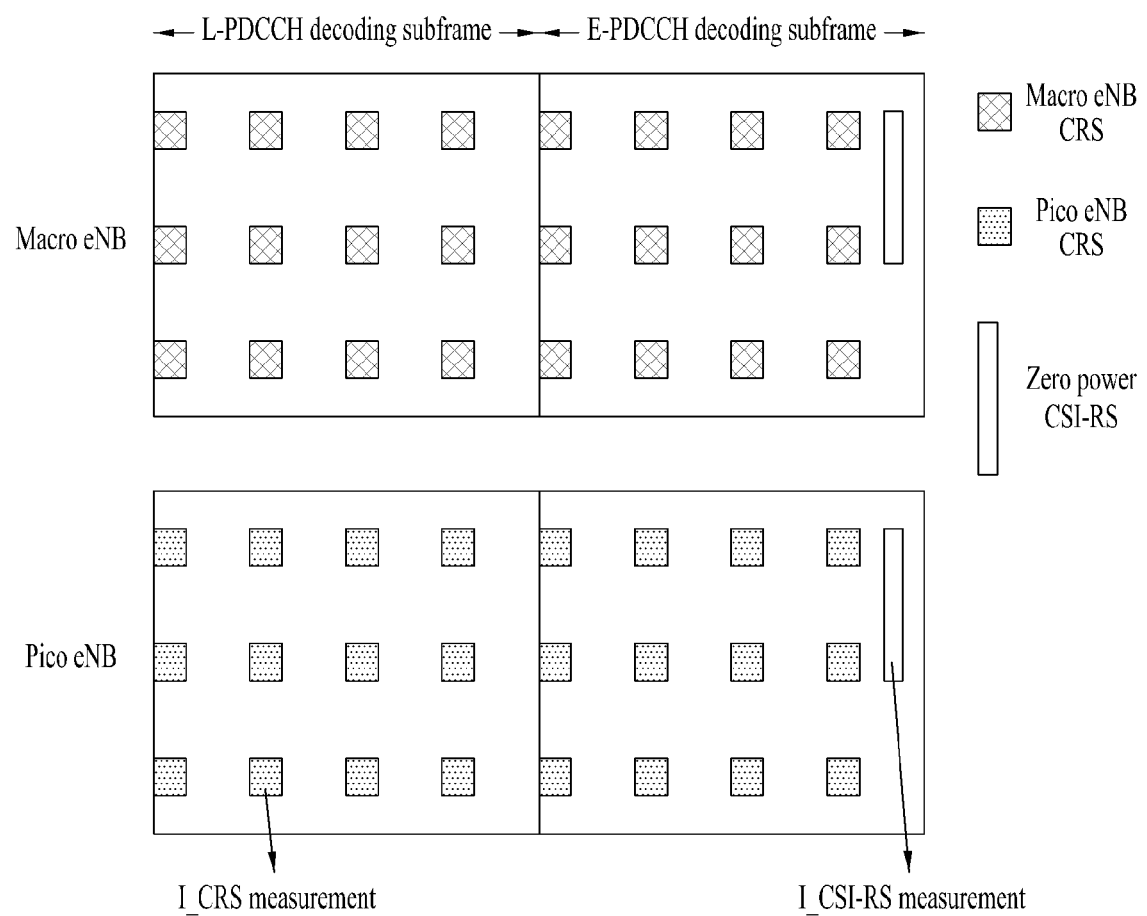
FIGS. 9 to 11 are diagrams related to the respective embodiments of the present invention.

Although CIF exists, a base station is able to assign DL CC set to monitor PDCCH. Hence, it is able to reduce the burden put on blind decoding of a user equipment. A PDCCH monitoring CC set may include a prescribed portion of all aggregated DL CCs and the user equipment can perform detection/decoding of PDCCH on the corresponding CC set only. In particular, in order to schedule PDSCH/PUSCH for the user equipment, the base station can transmit PDCCH on the PDCCH monitoring CC set only. In this case, a PDCCH monitoring DL CC set may be configured UE-specific, UE group-specific or cell-specific. For instance, in case that 3 DL CCs are aggregated, as shown in FIG. 9, DL CC A can be set as the PDCCH monitoring DL CC. If the CIF is disabled, PDCCH on each DL CC can schedule PDSCH on DL CC A only. On the other hand, if the CIF is enabled, the PDCCH on the DL CC A is able to schedule PDSCH on another DL CC as well. In case that the DL CC A is set as the PDCCH monitoring CC, PDSCCH is not transmitted on DL CC B and DL CC C.

In LTE systems next to Release 11, Enhanced-PDCCH (E-PDCCH) is taken into consideration as solutions for PDCCH capacity shortage due to CoMP (coordinate multi point), MU-MIMO (multi user-multiple input multiple output) and the like, PDCCH performance reduction due to inter-cell interference and the like. Unlike an existing PDCCH, the E-PDCCH can be transmitted on a PDSCH resource region. In the E-PDCCH, unlike an existing CRS-based PDCCH, channel estimation can be performed based on DMRS in order to obtain a precoding gain and the like. In the following description, in order to discriminate an existing PDCCH from E-PDCCH, the existing PDCCH shall be named L-PDCCH (legacy-PDCCH).

A user equipment can be configured to demodulate a plurality of the control channel types mentioned in the above description, i.e., both of the L-PDCCH and the E-PDCCH. By this, a user equipment on a specific condition (e.g., a user equipment for which high performance such as MTC (machine type communication) and the like is unnecessary) is made to demodulate a plurality of control channel types all the time. And, a request for CSI-RS based channel estimation and a request for an operation related to the channel estimation may become a burden.

In the following description, for a user equipment which can be configured to demodulate a plurality of the above-mentioned control channel types (e.g., L-PDCCH and E-PDCCH) together, a control channel of one type is demodulated only. And, using a reference signal of one type (e.g., CRS, CSI-RS, etc.), channel estimation and operations related to the channel estimation are performed.

A base station configures a subframe set 1 set to demodulate L-PDCCH only and to perform CRS-based channel estimation only and a subframe set 2 set to demodulate E-PDCCH only and to perform CSI-RS based channel estimation only and is then able to signal such configuration to a user equipment. In particular, the corresponding signaling can be performed in various ways (e.g., signaling the subframe set 1 only, signaling both of the subframe set 1 and the subframe set 2, etc.). Subsequently, based on the information on the above subframe set(s), the user equipment can determine whether to demodulate L-PDCCH or E-PDCCH depending on whether a currently received subframe is included in which subframe set. Moreover, the user equipment is able to determine whether to perform channel estimation using CRS in the received subframe and an operation (e.g., an interference measurement, an RRM/RLM (radio resource management/radio link monitoring) measurement, a PDSCH demodulation, etc.) related to the channel estimation or to perform channel estimation using CSI-RS and an operation related to the channel estimation.

A base station establishes a virtual cell for transmitting E-PDCCH and is then able to signal that the virtual cell is the cell separate from a cell for transmitting PDCCH. In particular, the base station configures a virtual Pcell and a virtual Scell on a single DL CC and is then able to set L-PDCCH and E-PDCCH to be transmitted on the virtual Pcell and the virtual Scell, respectively, and vice versa. Moreover, a user equipment may be configured to perform a CRS-based channel estimation and a corresponding operation in the virtual Pcell and to perform a CSI-RS based channel estimation in the virtual Scell. The user equipment is able to determine whether to perform demodulation on L-PDCCH based on information related to the virtual cell, a CRS based channel estimation and the like or to perform demodulation on E-PDCCH based on information related to the virtual cell, a CSI-RS based channel estimation and the like.

In particular, a user equipment may perform L-PDCCH demodulation/CRS based channel estimation or E-PDCCH demodulation/CSI-RS based channel estimation in accordance with information (e.g., the above-mentioned subframe set related information, the above-mentioned virtual cell related information, etc.) related to time-frequency resource to which a received subframe corresponds.

Based on the application principle of the present invention mentioned in the foregoing description, channel estimation and measurement (interference measurement included) are described in detail as follows.

First of all, regarding a channel estimation, a user equipment should perform a CRS based channel estimation and an operation related to the channel estimation in a subframe set 1 (or a virtual Pcell), whereas it is unnecessary for the user equipment to perform the channel estimation and the related operation. In doing so, the user equipment can avoid a complicated operation of performing a control channel blind decoding based on a UE-specific reference signal and a CRS-based channel estimation at the same time in a single subframe. To this end, the user equipment can be configured to perform various operations requiring the CRS based channel estimation in the subframe set 1 (or the virtual Pcell) in which the user equipment demodulates a CRS based control channel but not to perform the various operations requiring the CRS based channel estimation in the subframe set 2 (or the virtual Scell) in which the user equipment demodulates a UE-specific reference signal based control channel. In this case, the various operations requiring the above-mentioned CRS based channel estimation may include i) interference measurement in CRS RE, ii) CRS based RRM/RLM measurement, iii) CRS based PDSCH demodulation, and the like. In particular, the user equipment should measure all interferences including an inter-cell interference, a thermal noise and the like for CSI calculation. In doing so, a signal of a serving cell should be excluded from this measurement. For example, to this end, the user equipment estimates a channel of a serving cell CRS, regenerates a CRS, and is then able to measure an interference resulting from subtracting the regenerated serving cell CRS from a serving cell CRS RE [CRS cancellation]. Thus, in order to measure interference in the serving cell CRS RE, a CRS based channel measurement of the serving cell should precede. Hence, the corresponding measurement is preferably performed in the subframe set 1 (or the virtual Pcell). Regarding the CRS based RRM/RLM measurement, a user equipment measures RSRP and RSRQ from a serving cell CRS for RRM and also measures a link quality of the serving cell CRS for RLM. In doing so, since a CRS based channel estimation of a serving cell should precede, the corresponding measurement is preferably performed in the subframe set 1 (or the virtual Pcell) as well. Regarding the CRS based PDSCH demodulation, a user equipment may use a CRS for demodulation of PDSCH. In doing so, since a CRS based channel estimation of a serving cell should precede, the corresponding demodulation is preferably performed in the subframe set 1 (or the virtual Pcell) as well.

Thus, since the operation requiring the CRS based channel estimation is not performed in the subframe set 1 (or the virtual Pcell), CSI-RS based measurement and/or PDSCH demodulation may be set to be performed in the subframe set 2 (or the virtual Scell). In doing so, CSI-RS based RSRP or RSRQ measurement, CSI-RS based interference measurement or CSI measurement is included. In particular, the interference measurement can be set to be performed on a zero power CSI-RS.

Measurement (particularly, interference measurement) is described as follows. First of all, since a CRS based measurement and a CSI-RS based measurement generally differ from each other in attribute or measurement value, they cannot be used for the same usage or combined together. For instance, referring to FIG. 9, in case of an interference measurement, although a base station configures a specific zero power CSI-RS and instructs a user equipment to measure interference at a corresponding location, an adjacent $2^{nd}$ remote radio head (RRH) in a macro base station cell, which is a serving cell, may be transmitting PDSCH on the corresponding zero power CSI-RS resource. In doing so, the RRH is assumed as transmitting a CRS of the same cell ID of the macro base station. In this case, the interference measured from the corresponding zero power CSI-RS is very effective in measuring a possible CSI in case of a presence of interference from the $2^{nd}$ RRH. Yet, since the interference of the RRH is not included in an interference measurement performed by cancelling CRS, the corresponding interference may considerably differ from the interference measured from the corresponding zero power CSI-RS in attribute.

In this case, in order to prevent a false operation that the user equipment combines the two interference measurements, the base station can deliver an information on the attribute at the zero power CSI-RS through a separate signal. Particularly, this information may include an information indicating whether a transmission power of a whole cell at the specific zero power CSI-RS is 0 (i.e., whether a transmission power at every RRH configured to transmit CRS and the like with an ID of the serving cell is 0). If there is no further instruction, the user equipment can be regulated not to assume that a transmission power of a whole cell is 0 at the zero power CSI-RS despite that a transmission power of PDSCH transmitted to the corresponding user equipment is 0 (not to assume that the same interference remaining after cancelling the serving cell CRS is observed).

Yet, in some cases, by alternately using or combining the two kinds of the measurements (e.g., by taking an appropriate weighted average), a more accurate measurement value can be derived and utilized. In the following description, a method of utilizing the two kinds of the measurements by taking an interference measurement as an example is explained in detail. For clarity, a CRS based interference measurement value is expressed as I_CRS and a CSI-RS based interference measurement value is expressed as I_CSI-RS.

First of all, an interference measurement to be utilized in calculating a CSI can be determined depending on which control channel is configured to be decoded in a CSI reference resource. When a user equipment reports a CSI in a UL subframe n, the user equipment sets a CSI reference resource, which becomes a reference for a corresponding CSI calculation, to a DL subframe n-k. The user equipment then calculates a CQI value that satisfies a prescribed quality (i.e., an error probability becomes equal to or lower than 10%) when a transmission is performed on the corresponding CSI reference resource. In this case, if L-PDCCH is configured to be decoded in the CSI reference resource (i.e., if the CSI reference resource corresponds to a subframe set 1/virtual Pcell), since a CRS based channel estimation might be performed on the corresponding CSI reference resource already, CSI is preferably calculated using I_CRS. If E-PDCCH is configured to be decoded in the CSI reference resource (i.e., if the CSI reference resource corresponds to a subframe set 2/virtual Scell), it may be appropriate that a CRS based channel estimation is operated to use an unnecessary I_CSI-RS. Moreover, it may be able to select an interference measurement to use depending on a presence or non-presence of MBSFN subframe configuration of CSI reference resource. For instance, if a CSI reference resource is an MBSFN subframe, since it may be difficult to perform a sufficiently accurate interference measurement due to an insufficient number of CRS, I_CSI-RS is used. On the contrary, if a CSI reference source is not an MBSFN subframe, since a sufficient CRS number is guaranteed, it is able to operate to use I_CRS.

For example of another operation, a base station can designate to calculate which CSI using I_CRS or I_CSI_RS through an upper layer signal such as RRC. Such designation can be performed in a manner of indicating an interference measurement to be used for a CSI calculation explicitly or implicitly. For instance, if there is no indicator indicating that a specific CSI-RS is set for an interference measurement, it may be able to operate by using I_CRS. In addition, a base station can designate a specific CSI to be calculated using both I_CRS and I_CSI-RS, which means that an interference observed from CRS RE and an interference observed from CSI-RS RE are maintained constant by an appropriate configuration of a network. For instance, if a base station configures an interference measurement on a specific zero power CSI-RS and notifies that a transmission power of a whole cell is 0 through the corresponding zero power CSI-RS, a user equipment can be aware that a transmission power of a serving cell is not included at all in an interference measured on the zero power CSI-RS and that this interference measurement is equal to the measurement performed in a manner of cancelling a CRS of the serving cell. Hence, having received the information indicating that both I_CRS and I_CRS-RS are available together, the user equipment obtains a new interference measurement value by appropriately combining I_CRS and I_CRS-RS together and is then able to calculate a CSI based on the obtained new interference measurement value. Specifically, when CRS using subframes and CSI-RS using subframes are mixed together at a similar ratio, this operation may be effective in case that it is difficult to perform an accurate interference measurement using a measurement on either the CRS using subframes or the CSI-RS using subframes.

On the other hand, a user equipment can determine whether two interference measurements are combinable together. For instance, when two interference measurements are compared to each other, if there is prescribed similarity in-between and combinability can be reliably determined, a user equipment obtains a new interference measurement value by appropriately combining I_CRS and I_CRS-RS together and is then able to calculate a CSI based on the obtained new interference measurement value.

For instance, referring to FIG. 9, a macro base station (macro eNB) causes a strong interference to a pico base station (pico eNB) cell by transmitting a DL link signal with a relatively high power. In order to resolve the strong interference, it is intended to schedule a user equipment located at a pico cell edge in ABS (almost blank subframe) in which the macro base station does not transmit DL data. To this end, the user equipment should measure an interference in state free from the interference of the macro base station. In the example shown in FIG. 9, as two cell CRSs are equal to each other in 'v-shift', if the CRSs overlap each other, it is unable to measure such interference by a general operation using CRS. To solve this problem, a base station is able to instruct that interference will be measured through CSI-RS set to zero power by the macro base station (can be set to zero power for efficiency of interference measurement in aspect of a pico cell). Since a signal of the macro base station is not included in CSI-RS RE, a desired interference is observed. Meanwhile, as the corresponding user equipment includes a 'CRS cancellation' receiver having good performance, if the corresponding user equipment is able to reliably cancel CRSs of the macro base station and the pico base station, the desired interference free from the signal of the macro base station can be observed from CRS RE as well. Hence, the user equipment determines its own CRS cancellation capability, determines whether I_CRS and I_CRS-RS can be combined together by itself, and is then able to perform an appropriate CSI calculation depending on the determinations. In order to help the self-operation of the user equipment, the base station may be able to provide the user equipment with the information on an adjacent cell interference situation in a specific CSI-RS. For instance, the base station can inform the user equipment whether an adjacent specific cell or transmitting point performs a muting on a specific CSI-RS resource and whether the adjacent specific cell or transmitting point transmits PDSCH or CSI-RS. Based on this information, if the base station notifies that the adjacent specific cell performs the muting on a corresponding CSI-RS RE, the user equipment configured to measure I_CSI-RS on the specific CSI-RS is aware that I_CRS measured by cancelling a CRS of the corresponding adjacent cell has the same attribute of the I_CRS-RS in aspect that the I_CRS does not contain an interference of the corresponding adjacent cell and is then able to combine the two together.

Meanwhile, as mentioned in the foregoing description, a base station configures a virtual cell for transmitting E-PDCCH and is then able to signal that the virtual cell is the cell separate from a cell for transmitting PDCCH. In this case, a user equipment recognizes that the cell for transmitting the PDCCH and the cell for transmitting the E-PDCCH, i.e., two cells exist by being aggregated together, detects two control channels in accordance with an existing carrier aggregation scheme of LTE/LTE-A, and is then able to perform a corresponding operation.

Figure 10:
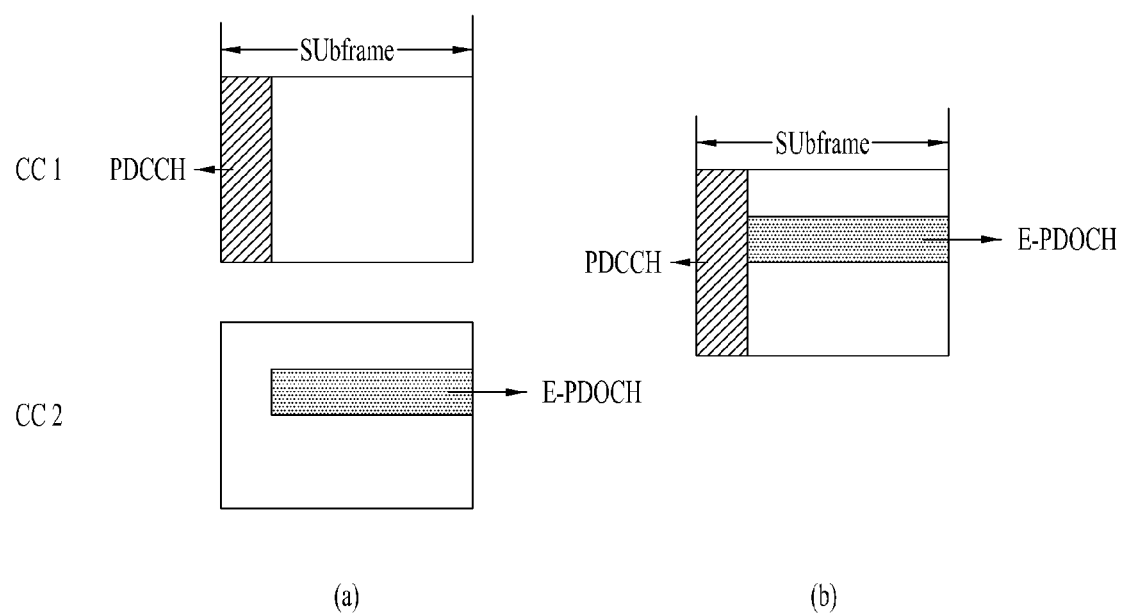

In the above-mentioned case, a virtual Pcell and a virtual Scell may correspond to two DL CCs, respectively [FIG. 10 (*a*)] or may be mapped to a single DL CC [FIG. 10 (*b*)]. Yet, compared to the case that PDCCH cell and E-PDCCH cell exist in different cells, respectively [FIG. 10 (*b*)], in case that control channels of two types exist in the same CC, as shown in FIG. 10 (*b*), a different operation may be requested to a user equipment.

Hence, in the following description, a method of performing a series of operations further optimized for a corresponding situation in a manner of setting a control channel type to a separate cell (or virtual cell) for a user equipment receiving a plurality of control channels and adding a separate signaling in case of a presence of a plurality of control channels in the same CC is explained.

First of all, in case of a cell ID, although a base station configures a plurality of cells for a user equipment, since control channels of two cells are transmitted from the same base station, they can have the same cell ID. Particularly, since this scheme can decrease the number of cell IDs consumed by a single base station, it helps a cell planning. When a signal is exchanged with an adjacent cell, this scheme can prevent redundancy of using a plurality of cell IDs. A user equipment having control channels of two types set with the same cell ID can maintain various parameters (e.g., a reference signal sequence, etc.), which are defined according to a cell ID, equally in the control channels of the two types. In aspect of aggregating multiple cells, although two cells have the same cell ID, they can be signaled in a manner of being discriminated (e.g., being assigned with different CIFs) according to types of controls channel used by the cells, respectively. on the other hand, although different cell IDs are assigned to control channels of two types, respectively, prescribed parameters can be maintained equally. For instance, in aspect of downlink, since two cells have different IDs, although the two cells are identified as different cells, the same cell ID can be used in aspect of uplink linked to them. When E-PDCCH is used, although a cell ID of the E-PDCCH is different from that of PDCCH, various parameters (e.g., a reference signal sequence, etc.) related to a UL transmission can be generated from the PDCCH cell ID.

For another instance, although different cell IDs are assigned to control channels of two types, various parameters (e.g., DMRS sequence, PDSCH scrambling sequence, synchronization signal, etc.) related to PDSCH can be maintained equally. In this case, if a PDCCH cell is taken as a reference, CIF is included in DCI transmitted on E-PDCCH and a user equipment can be informed that the PDSCH scheduled by the E-PDCCH is transmitted in viewpoint of the cell that transmits the PDCCH. On the other hand, an operation can be performed in a manner of assuming that a scheduling by the E-PDCCH is always a cross carrier scheduling on a PDSCH transmission in the PDCCH cell without having CIF included.

Secondly, although a base station configures a plurality of cells for a user equipment, since control channels of two cells are transmitted from the same base station, it is preferable that frame type (i.e., FDD or TDD) is set equally. In case of TDD, it is preferable that UL/DL configuration and special subframe configuration are set equally as well.

Thirdly, regarding UL ACK/NACK, in case that a plurality of control channels are located at the same CC, it is able to assume that maximum one PDSCH is transmitted in a single subframe. Hence, in case that UL ACKs/NACKs for PDSCHs of a plurality of DL subframes are multiplexed in a single UL subframe, a multiplexing operation can be performed on the assumption that maximum one PDSCH is transmitted in a single subframe. In particular, when a channel selection is made using PUCCH format 1a/1b or UL ACK/NACK is transmitted through PUCCH format 3, if ACKs/NACKs for M DL subframes are transmitted in a single UL subframe, even if two cells are configured, an appropriate UL ACK/NACK operation can be performed on the assumption of maximum 1:M UL/DL linkage. In this case, if two cells exist in different CCs, respectively, maximum 1:2 M linkage should be assumed.

In case of FDD, since a single DL subframe is basically connected to a single UL subframe, although two cells are configured, it is able to report ACK/NACK for PDSCH with single PUCCH format 1a/1b on the assumption that a single PDSCH is transmitted in a single DL subframe only.

When PUCCH format 3 is set to be used, in case that E-PDCCH independently schedules a single PDSCH by regarding a cell for transmitting the E-PDCCH as Scell, an operation can be performed in a manner of continuously using the PUCCH format 3 instead of falling back into PUCCH format 1a/1b. This means that every TPC command in DCI of the E-PDCCH is interpreted as ACK/NACK resource indicator (ARI) and also means that an operation of falling back into the PUCCH format 1a/1b is performed only if transmitting a single PDSCH from a cell for transmitting PDCCH. When a cell for transmitting PDCCH and a cell for transmitting E-PDCCH manage PUCCH resource regions separated from each other, respectively, such an operation has an advantage such that a base station can avoid a complicated operation of performing blind decoding on PUCCH format 1a/1b transmitted as fallback on PUCCH resources of both sides in advance. Moreover, when all user equipment use PUCCH format 3 in the cell for transmitting E-PDCCH, since although a separate PUCCH format 1a/1b resource is not allocated to the cell for transmitting the E-PDCCH, a corresponding operation has no problems. Hence, it is advantageous in helping the PUCCH resource utilization.

Fourthly, PHICH for carrying ACK/NACK in response to a PUSCH transmission of a user equipment is generally transmitted from a cell having transmitted a UL grant for a corresponding PUSCH. Yet, in case that two control channels are configured in a single CC, PHICH for the UL grant carrying PUSCH is transmitted to E-PDCCH by PDCCH, and vice versa. To this end, a base station can beforehand announce that the PHICH transmission is movable between prescribed cells. For instance, in a specific UL subframe, PHICH for PUSCH scheduled by a specific control channel can be transmitted on a different control channel type. For this operation, information indicating when the PHISCH will be transmitted on a prescribed control channel type should be delivered to a user equipment in advance.

Fifthly, since a plurality of control channels schedule PDSCH on the same CC, it is unnecessary to make a CSI report separately. Hence, two cells discriminated from each other in accordance with a control channel type can make a report by measuring a single CSI based on the same CSI-RS or CRS. For instance, a CSI measured for a PDCCH transmitted cell can be transmitted as an aperiodic CSI report triggered by a cell for transmitting E-PDCCH. In this case, although two cells are configured, since it is unnecessary to make two CSI reports, it is unnecessary for the aperiodic CSI report to separately indicate a cell that becomes a target of the CSI report. Hence, it is able to reduce a signaling overhead in a manner of maintaining a CSI request field as 1 bit instead of including an indicator of a cell becoming the CSI report target like the carrier aggregation of the legacy LTE/LTE-A. in order to lower a false alarm probability without decreasing the number of bits of the CSI request field, the rest of states except a state of not making a CSI report are fixed to a predetermined specific value or the rest of the states can be interpreted as having the same meaning (i.e., the meaning of reporting a single CSI in common to two cells).

Sixthly, regarding a transmission mode, since a plurality of control channel types schedule PDSCH on the same CC, transmission modes of two cells can be maintained equally. Hence, a separate transmission mode signaling is unnecessary for each cell. If a fact that two cells are located at the same CC is indicated, a transmission mode designated to one of the two cells can be set to indicate a transmission mode of the other as well.

Figure 11:
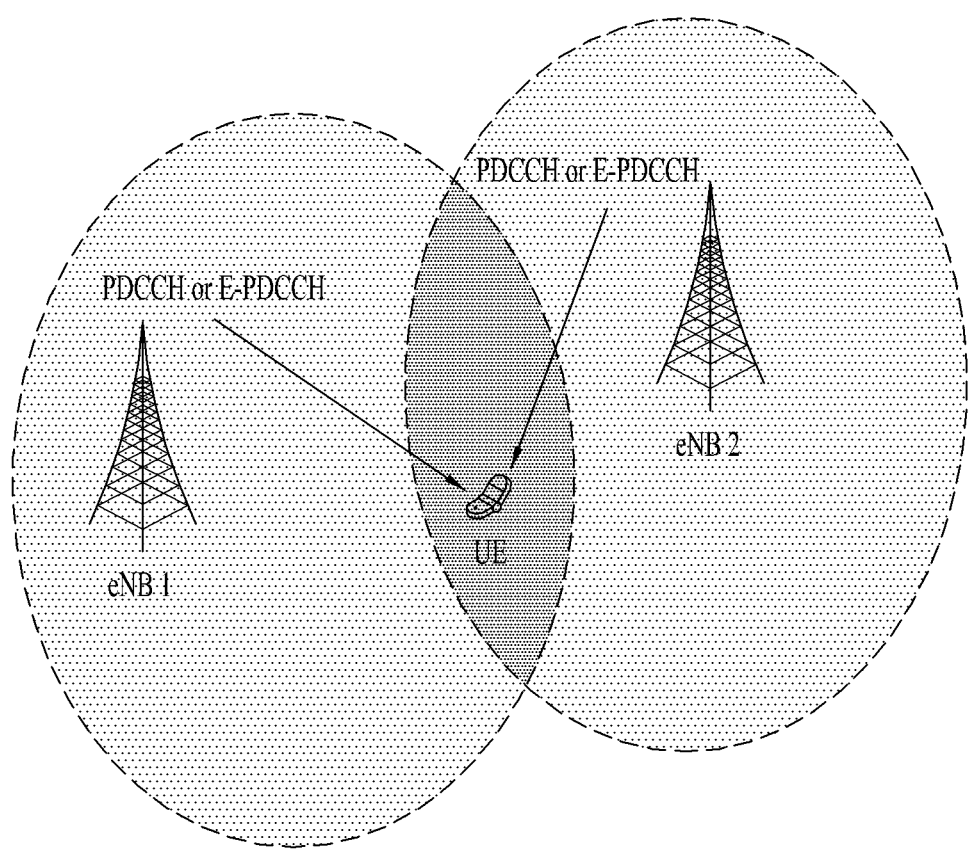

The above-described scheme of detecting a plurality of control channels located at the same CC is applicable to a CoMP (coordinated multi point) situation in which a plurality of base station transmit signals coordinately. For instance, referring to FIG. 11, one base station is able to transmit a control channel on PDCCH and another base station is able to transmit a control channel on E-PDCH. Since different base stations can be identified with different cell IDs, respectively, it is able to consider a case that every base station transmits a control channel of the same type on the same CC. Since this CoMP situation is similar to the aforementioned case of configuring a plurality of cells in the same CC, the operating principle of the present invention mentioned in the foregoing description is partially applicable in an overlapping range. For instance, since one PDSCH will be transmitted on a single CC from two base stations in CoMP situation, it is able to perform operations (e.g., reporting UL/ACK/NACK, forming a scrambling sequence of RS, etc.) by applying the above-described principle.

Figure 12:
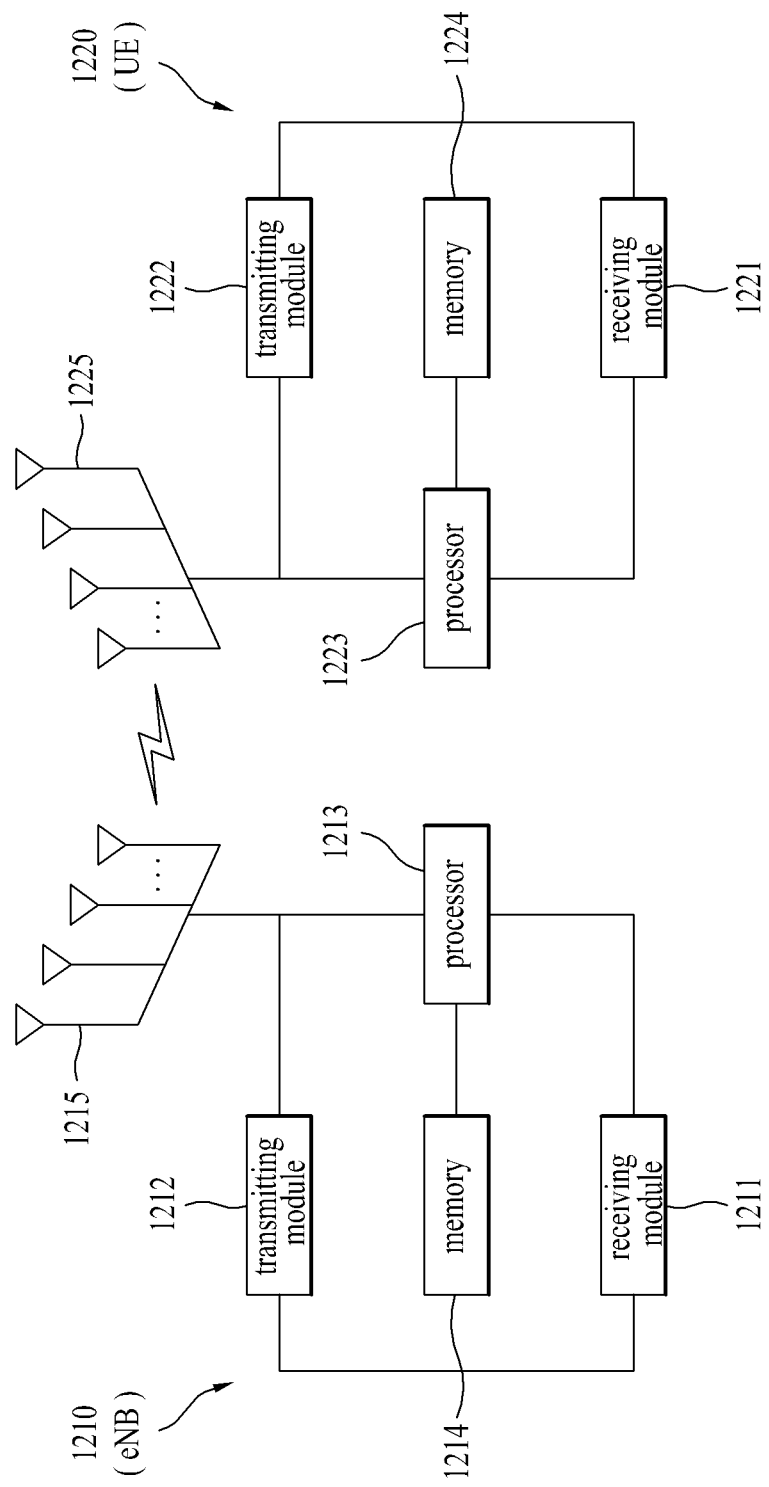
FIG. 12 is a diagram for configuration of a transceiving device.

FIG. 12 is a diagram for configurations of a transmitting point device and a user equipment device according to the present invention.

Referring to FIG. 12, a transmitting point device 1210 according to the present invention may include a receiving module 1211, a transmitting module 1212, a processor 1213, a memory 1214 and a plurality of antennas 1215. A plurality of the antennas 1215 may mean a transmitting point device supportive of MIMO transmission and reception. The receiving module 1211 can receive various signals, data and information in uplink from a user equipment. The transmitting module 1212 can transmit various signals, data and information in downlink to the user equipment. And, the processor 1213 can control overall operations of the transmitting point device 1210.

The processor 1213 of the transmitting point device 1210 according to one embodiment of the present invention can perform the methods mentioned in the foregoing description.

The processor 1213 of the transmitting point device 1210 performs functions of operating and processing information received by the transmitting point device 1210, information to be transmitted by the transmitting point device 1210, and the like. The memory 1214 can store the operated and processed information and the like for a prescribed period and can be substituted with such a component as a buffer (not shown in the drawing) and the like.

Referring to FIG. 12, a user equipment device 1220 according to the present invention may include a receiving module 1221, a transmitting module 1222, a processor 1223, a memory 1224 and a plurality of antennas 1225. A plurality of the antennas 1225 may mean a user equipment device supportive of MIMO transmission and reception. The receiving module 1221 can receive various signals, data and information in downlink from a transmitting point. The transmitting module 1222 can transmit various signals, data and information in uplink to the transmitting point. And, the processor 1223 can control overall operations of the user equipment device 1220.

The processor 1223 of the user equipment device 1220 according to one embodiment of the present invention can perform the methods mentioned in the foregoing description.

The processor 1223 of the user equipment device 1220 performs functions of operating and processing information received by the user equipment device 1220, information to be transmitted by the user equipment device 1220, and the like. The memory 1224 can store the operated and processed information and the like for a prescribed period and can be substituted with such a component as a buffer (not shown in the drawing) and the like.

In the above-mentioned detailed configurations of the transmitting point device 1210 and the user equipment device 1220, the contents or items explained in the descriptions of the various embodiments of the present invention may be independently applicable or at least two embodiments of the present invention may be simultaneously applicable. And, redundant descriptions shall be omitted from the following description for clarity.

The description of the transmitting point device 1210 with reference to FIG. 12 may be identically applicable to a relay node device as a DL transmitting entity or a UL receiving entity. And, the description of the user equipment device 1220 with reference to FIG. 12 may be identically applicable to a relay node device as a UL transmitting entity or a DL receiving entity.

Embodiments of the present invention can be implemented using various means. For instance, embodiments of the present invention can be implemented using hardware, firmware, software and/or any combinations thereof.

In case of the implementation by hardware, a method according to each embodiment of the present invention can be implemented by at least one selected from the group consisting of ASICs (application specific integrated circuits), DSPs (digital signal processors), DSPDs (digital signal processing devices), PLDs (programmable logic devices), FPGAs (field programmable gate arrays), processor, controller, microcontroller, microprocessor and the like.

In case of the implementation by firmware or software, a method according to each embodiment of the present invention can be implemented by modules, procedures, and/or functions for performing the above-explained functions or operations. Software code is stored in a memory unit and is then drivable by a processor. The memory unit is provided within or outside the processor to exchange data with the processor through the various means known to the public.

As mentioned in the foregoing description, the detailed descriptions for the preferred embodiments of the present invention are provided to be implemented by those skilled in the art. While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents. For instance, the respective configurations disclosed in the aforesaid embodiments of the present invention can be used by those skilled in the art in a manner of being combined with one another. Therefore, the present invention is non-limited by the embodiments disclosed herein but intends to give a broadest scope matching the principles and new features disclosed herein.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents. And, it is apparently understandable that an embodiment is configured by combining claims failing to have relation of explicit citation in the appended claims together or can be included as new claims by amendment after filing an application.

INDUSTRIAL APPLICABILITY

The embodiments of the present invention mentioned in the foregoing description can apply to various kinds of mobile communication systems.

What is claimed is:

1. A method of receiving a signal, which is received by a user equipment in a wireless communication system, the method comprising:
receiving a plurality of subframes including a first subframe and a second subframe; and
performing a channel estimation using either a cell specific reference signal (CRS) or a channel state information-reference signal (CSI-RS) in accordance with information related to a time-frequency resource having the first subframe and the second subframe correspond thereto,
wherein a first interference is measured in the first subframe for performing the channel estimation using the CRS, and a second interference is measured in the second subframe for performing the channel estimation using the CSI-RS,
wherein when the user equipment measures interferences in the plurality of subframes, both of the first interference and the second interference are considered together if the user equipment receives a prescribed information, and
wherein the prescribed information indicates whether a transmission power of a whole serving transmitting point of the user equipment is zero in a zero power CSI-RS, when the second interference is measured using the zero power CSI-RS.

2. The method of claim 1, wherein if the channel estimation is performed using the CRS, the user equipment demodulates physical downlink control channel (PDCCH) only, and wherein if the channel estimation is performed using the CSI-RS, the user equipment demodulates enhanced-physical downlink control channel (E-PDCCH) only.

3. The method of claim 1, wherein the information related to the time-frequency resource comprises a subframe set configured to estimate a channel using the CRS.

4. The method of claim 1, wherein if the channel estimation is performed using the CSI-RS, the user equipment is set not to perform an interference measurement using a CRS transmitted resource element, a radio resource management (RRM)/radio link monitoring (RLM) measurement using the CRS, and a demodulation of physical downlink shared channel (PDSCH) using the CRS.

5. The method of claim 1, wherein if a subframe among the plurality of subframes corresponds to a CSI reference resource, an interference measurement for reporting the CSI is performed based on a reference signal used for the channel estimation of the subframe.

6. The method of claim 5, wherein if a subframe among the plurality of subframes comprises a multicast broadcast signal frequency network (MBSFN) subframe, an interference measurement for reporting the CSI is performed based on the CSI-RS.

7. The method of claim 1, wherein the information related to the time-frequency resource indicates whether each of the plurality of subframes corresponds to a virtual primary cell (PCell) or a virtual secondary cell (SCell).

8. The method of claim 1, wherein if a subframe among the plurality of subframes corresponds to a virtual PCell, the channel estimation uses the CRS, and wherein if a subframe among the plurality of subframes corresponds to a virtual SCell, the channel estimation uses the CSI-RS.

9. The method of claim 1, wherein a frequency resource of the plurality of subframes corresponds to a single component carrier.

10. In a wireless communication system, a user equipment device comprising:
a receiving module; and
a processor,
wherein the processor is configured to:
control the receiving module to receive a plurality of subframes including a first subframe and a second subframe, and
perform a channel estimation using either a cell specific reference signal (CRS) or a channel state information-reference signal (CSI-RS) in accordance with an information related to a time-frequency resource having the first subframe and the second subframe correspond thereto,
wherein a first interference is measured in the first subframe for performing the channel estimation using the CRS, and a second interference is measured in the second subframe for performing the channel estimation using the CSI-RS,
wherein when the user equipment measures interferences in the plurality of subframes, both of the first interference and the second interference are considered together if the user equipment receives a prescribed information, and
wherein the prescribed information indicates whether a transmission power of a whole serving transmitting point of the user equipment is zero in a zero power CSI-RS, when the second interference is measured using the zero power CSI-RS.

* * * * *